United States Patent [19]

Pires

[11] Patent Number: 5,226,859
[45] Date of Patent: Jul. 13, 1993

[54] CONTINUOUSLY OR INFINITELY VARIABLE TRANSMISSION FREE OF OVER-RUNNING CLUTCHES

[76] Inventor: Paul B. Pires, 1350 Dundee Ave., Ben Lomond, Calif. 95005

[21] Appl. No.: 660,292

[22] Filed: Feb. 22, 1991

[51] Int. Cl.⁵ .............................................. F16H 29/04
[52] U.S. Cl. ..................... 475/169; 74/117; 74/836; 74/74; 475/170; 475/171; 475/329; 475/330
[58] Field of Search ............... 475/169, 170, 171, 199, 475/204, 296, 302, 329, 330; 74/74, 79, 117, 436, 831, 836

[56] References Cited

U.S. PATENT DOCUMENTS

| | | | |
|---|---|---|---|
| 787,080 | 4/1905 | Conant | 475/170 |
| 2,218,840 | 10/1940 | Barber | 74/117 |
| 2,547,453 | 4/1951 | Egy | 74/117 X |
| 2,973,653 | 3/1961 | Riedl | 74/117 |
| 4,338,830 | 7/1982 | Rodaway | 475/169 |
| 4,338,831 | 7/1982 | Rodaway | 475/169 X |
| 4,515,026 | 5/1985 | Perkins | 475/302 X |
| 4,598,610 | 7/1986 | Kim | 475/330 |
| 4,796,477 | 1/1989 | Brems | 475/329 X |
| 4,813,298 | 3/1989 | Kurtossy | 475/330 |
| 4,909,101 | 3/1990 | Terry, Sr. | 475/297 X |
| 4,983,151 | 1/1991 | Pires | 475/296 X |
| 5,081,877 | 1/1992 | Mercat | 74/117 X |
| 5,099,706 | 3/1992 | Irvin | 475/296 X |
| 5,108,352 | 4/1992 | Pires | 475/170 |
| 5,129,272 | 7/1992 | Irvin | 475/296 X |

FOREIGN PATENT DOCUMENTS

87/05086  8/1987  PCT Int'l Appl. ................. 475/330

*Primary Examiner*—Rodney H. Bonck
*Assistant Examiner*—David E. Henn
*Attorney, Agent, or Firm*—Ware & Freidenrich

[57] ABSTRACT

An oscillating rachet style continuously or infinitely variable transmission is disclosed herein, that is, one which, in its operation, relies on a plurality of different successive intermediate rotations that vary in speed and direction in accordance with their own respective oscillatory waveform, each waveform being out of phase with one another in a predetermined way. These intermediate rotations are used to convert the rotational input to a plurality of uni-direction output rotations, without the aid of any over-running clutches. These later outputs vary in speed in accordance with their own respective waveforms and are used to produce a modified rotational output.

8 Claims, 19 Drawing Sheets

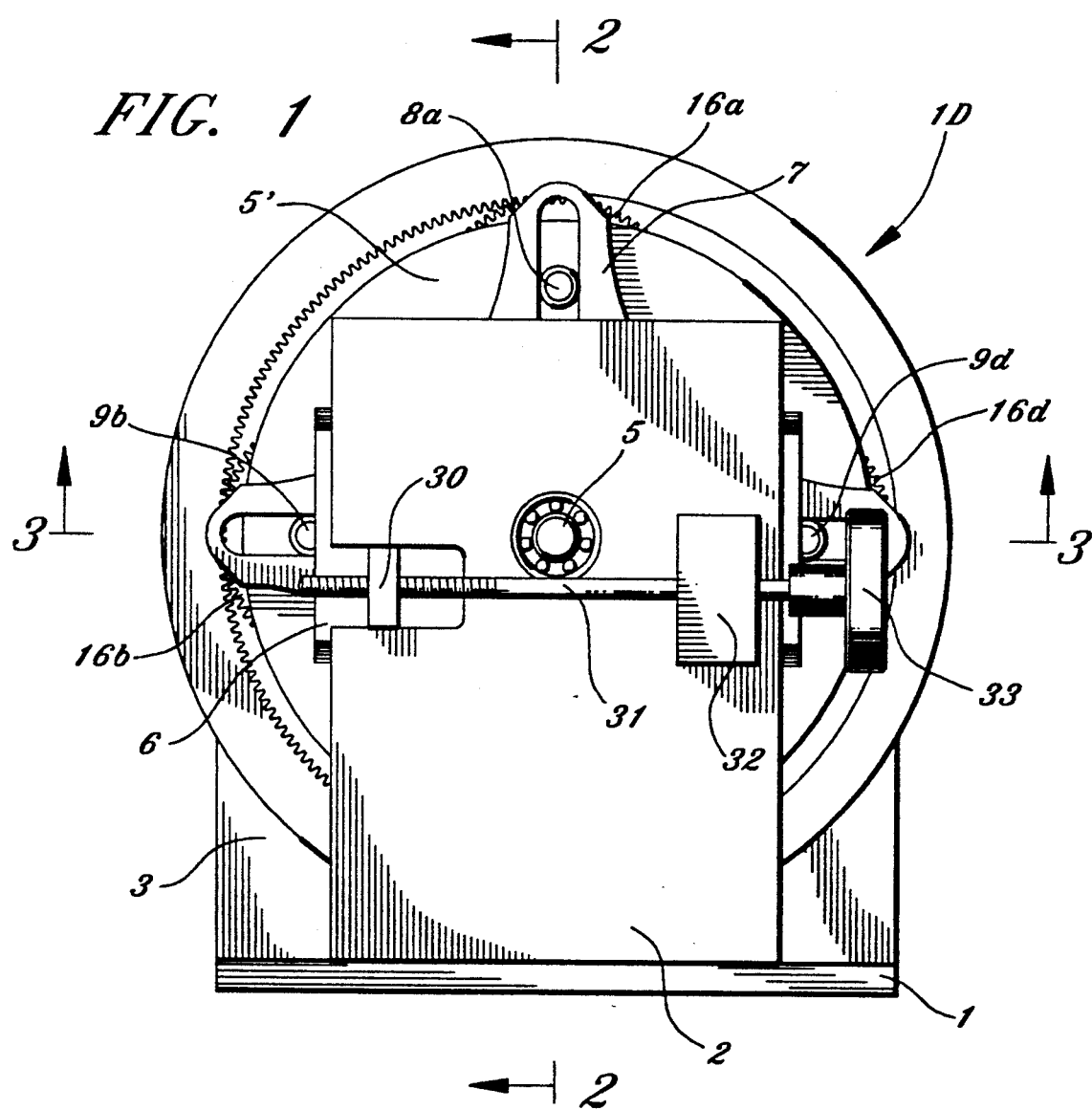

CONTINUOUSLY OR INFINITELY VARIABLE TRANSMISSION FREE OF OVER-RUNNING CLUTCHES

The present invention relates generally to racheting style infinitely or continuously variable transmissions (IVTs) generally and more particularly to an IVT including a specifically designed high speed switching assembly instead of over-running clutches. An IVT of the general type to which the present invention is directed is disclosed in U.S. Pat. No. 4,983,151 to Paul B. Pires on Jan. 8, 1991 and incorporated herein by reference.

A transmission is a device which accepts a rotational power input from an engine and by way of changing ratio (mechanical advantage), changes torque and speed components to more closely match the demands of the output usage need.

There are three basic types of mechanical transmissions which employ "hard gearing" to conduct power from the input to the output and to change ratios. They are set fort immediately below and a brief description of each will follow.

1. A conventional manual transmission.
2. An automatic transmission.
3 A "racheting" type of continuously or infinitely variable transmission.

FIG. 1A is a symbolic representation of a manual transmission where the different ratio gear sets are selected manually while the power from the engine is momentarily disconnected by manually operating the clutch. The shift linkage is configured so that no two gear sets can be engaged at the same time as this would cause the transmission to bind up and break.

FIG. 1B is a symbolic representation of an automatic transmission. Input power from the engine is split into multiple paths to individual ratio gear sets, each of which is composed of an automatically operated clutch, a ratio changing gear set and one side of an over-running clutch or "freewheel". The other side of each over-running clutch is connected to a common output shaft. Ratio change is accomplished by locking the clutch of a ratio higher path while unlocking the clutch of the lower ratio path. To avoid excessive shock which would occur if all clutches were unlocked at once allowing the engine to race and then engaging the higher ratio clutch, the higher ratio clutch is engaged before the lower ratio clutch is unlocked. To avoid binding and breakage while both clutches are engaged, each ratio gear set drives the common output through an over-running clutch. This allows a higher ratio gear set to drive the common output while over-running the engaged lower ratio gear set.

FIG. 1C is a symbolic representation of a racheting type of continuously or infinitely variable transmission. This device uses some rotational oscillations of variable amplitude from input rotation supplied by the engine. The desired polarity of these oscillations is collected by over-running clutches and delivered to the transmission's output shaft to provide an output ratio proportionate to the amplitude of the oscillations generated. These over-running clutches lock up to transmit the "desired" polarity of oscillations allowing them to drive the output while allowing the "undesired" polarity oscillations to be over-run and not effect the output. An example of this is described in the Pires patent recited previously.

Over-running clutches, ORC's, are needed in a "racheting" style IVT for the obvious reason that the oscillations generated in this type of device are always characterized by both positive and negative motion. The ORC's are used to collect only the desired polarity and to allow the other polarity to be over-run. These devices do not do this job well for the following reasons.

1. While ORC's do transmit the proper polarity motion and do allow the other polarity of motion to over-run without transferring torque they also allow for any output motion in excess of the proper polarity input. This accounts for the free-wheeling behavior which prevents any practical dynamic e breaking from being developed.

2. Since the ORC's see only polarity of oscillation and not phase relative to input speed, they reduce the range of the IVT in that offsetting the device in one direction has the same effect as offsetting it in the other direction even though the phase is opposite instead of producing a reverse output or an augmented forward output effectively cutting in half the device's adjustment range.

3. ORC's are the weakest link in a transmission and are quite bulky for their rated torque as well as being devices of mysterious reliability. Furthermore, they have practical limitations concerning the cycle rate they can tolerate and the total number of switchings they can survive.

4. It would be desirable to have a transmission that was "locked-up" at high speed with relatively few moving parts and the IVT can be configured this way. However, this automatically loads the ORC's in a direction in line with their over-running direction so that they cannot deliver torque in this configuration.

5. Finally ORC's expensive and require exotic pressurized lubrication schemes to allow any reliability in operation, as well as requiring tight tolerances in assembly and expensive bearings to support all radial and thrust loads.

In view of the foregoing, it is an object of the present invention to provide a racheting style infinitely or continuously variable transmission which does not require over-running clutches, thereby eliminating the drawbacks discussed immediately above.

It is a more particular object of the present invention to provide the IVT disclosed herein with an uncomplicated and yet reliable high speed switching assembly instead of over-running clutches.

As will be described in more detail hereinafter, the transmission disclosed herein includes four functional arrangements or means generally. A first means is provided for establishing a rotational input. A second means responds to this input for producing a plurality of different, successive intermediate rotations, each of which varies in speed and direction (i.e., reciprocates back and forth) in accordance with its own respective oscillatory waveform such that all of the waveforms are out of phase with one another in a predetermined way. A third means is provided and responds to each of the intermediate rotations for producing a plurality of different, successive output rotations without the aid of any over-running clutches. These output rotations vary in speed in accordance with their own respective waveforms but rotate in only one and the same direction. A fourth means responds to the output rotations for ultimately producing a modified rotational output.

The IVT designed in accordance with the present invention and particularly its high speed switching arrangement will be disclosed in more detail hereinafter in conjunction with the drawings, wherein:

FIG. 1A diagrammatically illustrates a prior art manual transmission;

FIG. 1B diagrammatically illustrates a prior art, standard automatic transmission;

FIG. 1C diagrammatically illustrates an IVT of the prior art type including over-running clutches such as the one disclosed in the previously recited Pires patent;

FIG. 1D diagrammatically illustrates an IVT which is designed in accordance with the present invention to include a specifically configured high speed switching assembly as an alternative to over-running clutches;

Figure 1A:
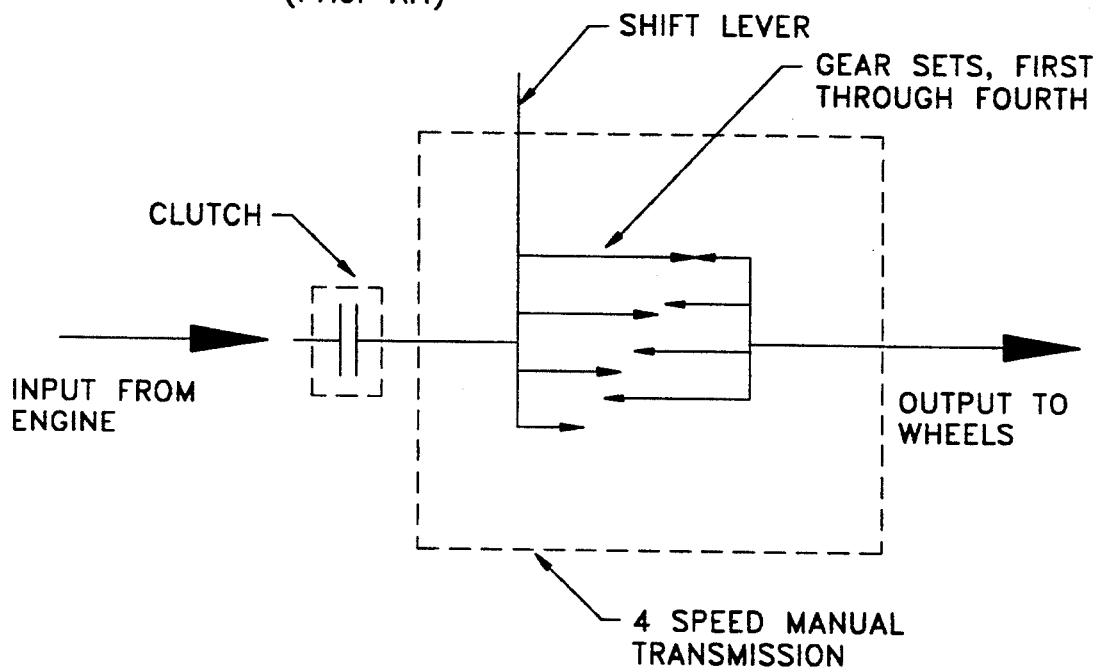
FIG. 1 is a front view of an actual working embodiment of the IVT designed in accordance with the present invention.
Figure 1B:
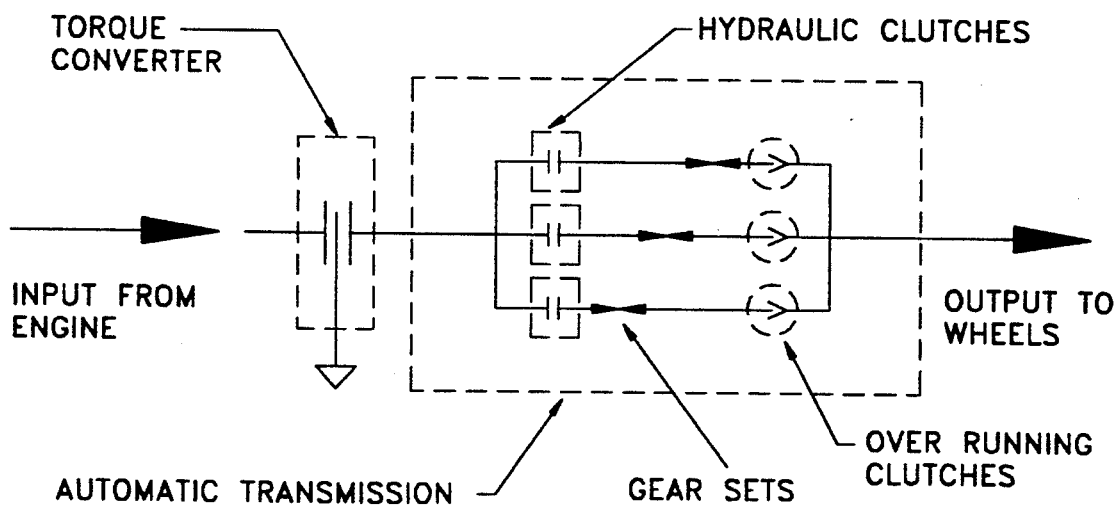
Figure 1C:
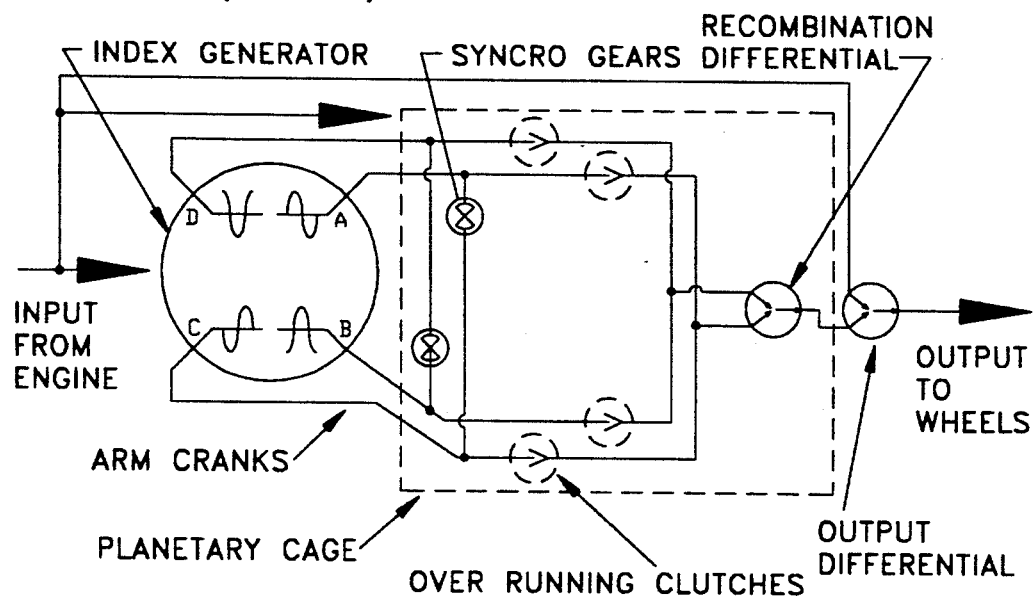
Figure 1D:
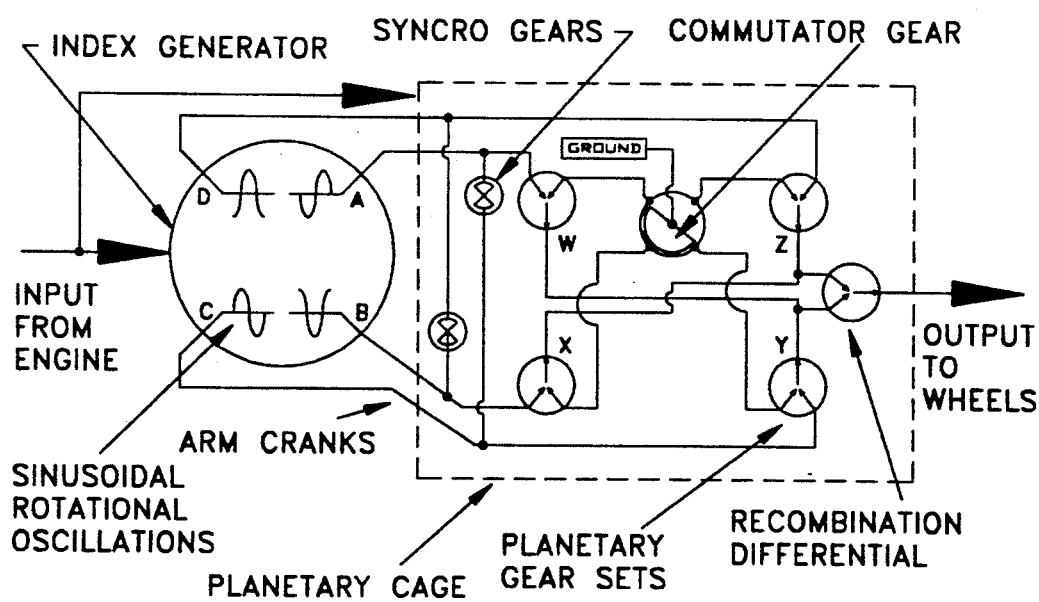

Turning to the drawings, attention is now directed to FIG. 1D which illustrates diagrammatically an IVT device 1 designed in accordance with the present invention. As seen in this Figure, the invention employs an eccentric member (index generator) arms to generate variable amplitude rotational oscillations in response to input rotation from the engine. Each rotational oscillation is delivered as one input to a planar differential gear set W, X, Y and Z. Another rotational input to these planar differential gear sets is from the commutator gear assembly. When the "desired" polarity of oscillation is present at a crank arm, the commutator assembly supplies a supplemental rotational input to that crank arm's planar differential gear set. When a planar differential has two inputs, it produces an output which is the average of the two inputs. This intermediate output is then conducted to the recombination differential where it is combined with any other intermediate outputs which are allowed by the commutator to produce the output of the transmission. When the "undesired" polarity of rotational oscillations is present at a crank arm, the commutator input to that arm's planar differential gear set is disconnected allowing that commutator input "leg" to "freely" rotate which in turn allows the output of that "undesired" planar differential to rotate freely and not inhibit the output of the device.

In the device shown in FIG. 1D, the intermediate outputs of the planar gear sets W and Y are joined in common to form a pair and the intermediate outputs of the planar gear sets X and Z are joined in common to form a pair. The two pairs of crank arms associated with these two planar differential pairs are each synchronized so that the arms in a pair always have an equal and opposite rotational oscillation. This means that when one crank arm of a pair has "desired" oscillation, for example clockwise, the other crank arm has an "undesired" oscillation, for example counterclockwise. Because of the intermediate output interconnection of pairs, when one planar differential commutator input leg is "freely" rotating while its crank arm oscillation is "undesired", its output interconnected with the input of the "desired" set has the desired output rotation which is composed of the "desired" rotational oscillation and the engaged commutator supplemental speed. This determines the speed of the "free" commutator input "leg" of that pair as the average of the "desired" oscillation plus the "desired" sets engaged commutator input plus the "undesired" oscillation. Since the commutator starts supplying a supplemental input to an arm's planar differential when that arms oscillation changes from "undesired" to "desired" and since the oscillation of that arm is zero at that point (preparatory to reversing), and since the other arm's oscillation of that pair is also zero (due to the synchros), providing only engaged commutator rotation (due to the common output connection), the speed of the "free" commutator input "leg" is the same as the speed of the other commutator input "leg" (which is connected to the commutator) in that pair. This means that no shock will occur when the "free" leg of a planar differential is re-connected to the commutator assembly.

Figure 2:
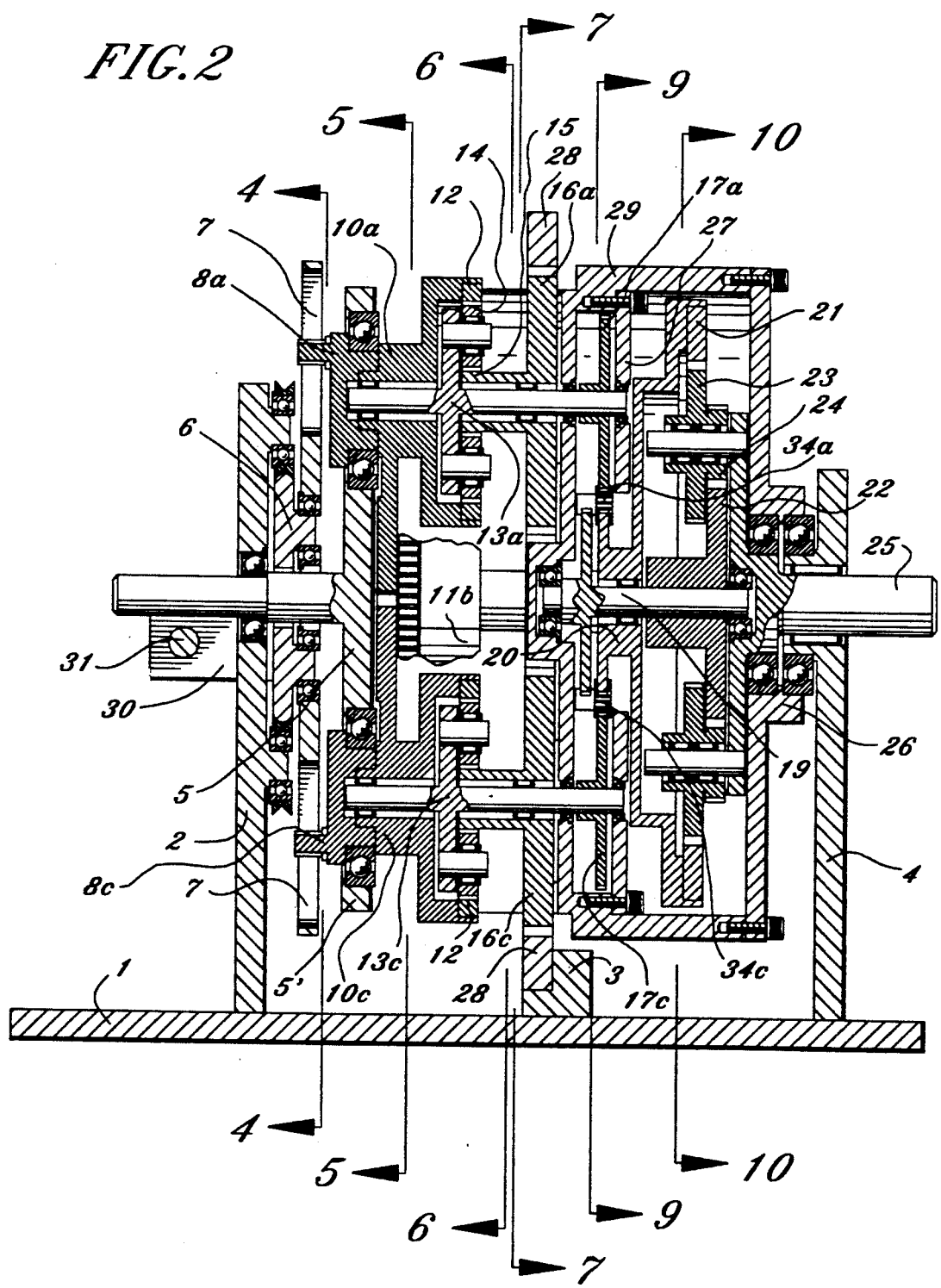
FIG. 2 is a side cutaway view of the IVT of FIG. 1 taken along the axis of an arm crank pair (8a) and (8c), along line 2—2 in FIG. 1.

Turning now to FIG. 1, input to the device 1D, rotational power (in this case clockwise), is supplied by a motor or engine (not shown), connected to the input shaft-front plate 5' through shaft 5. As seen in FIG. 2, the input shaft-front plate 5' is connected to the planetary rotor 29, support plate 27 and back plate 26 to form a cage which rotates as a unit in response to input rotation supplied to the shaft of plate 5'. This planetary cage is supported for rotation by the front support 2 and the rear support 4 which are attached to the base 1. The planetary cage corresponds in function to the planetary assembly 16 disclosed in the previously recited Pires patent.

Figure 3:
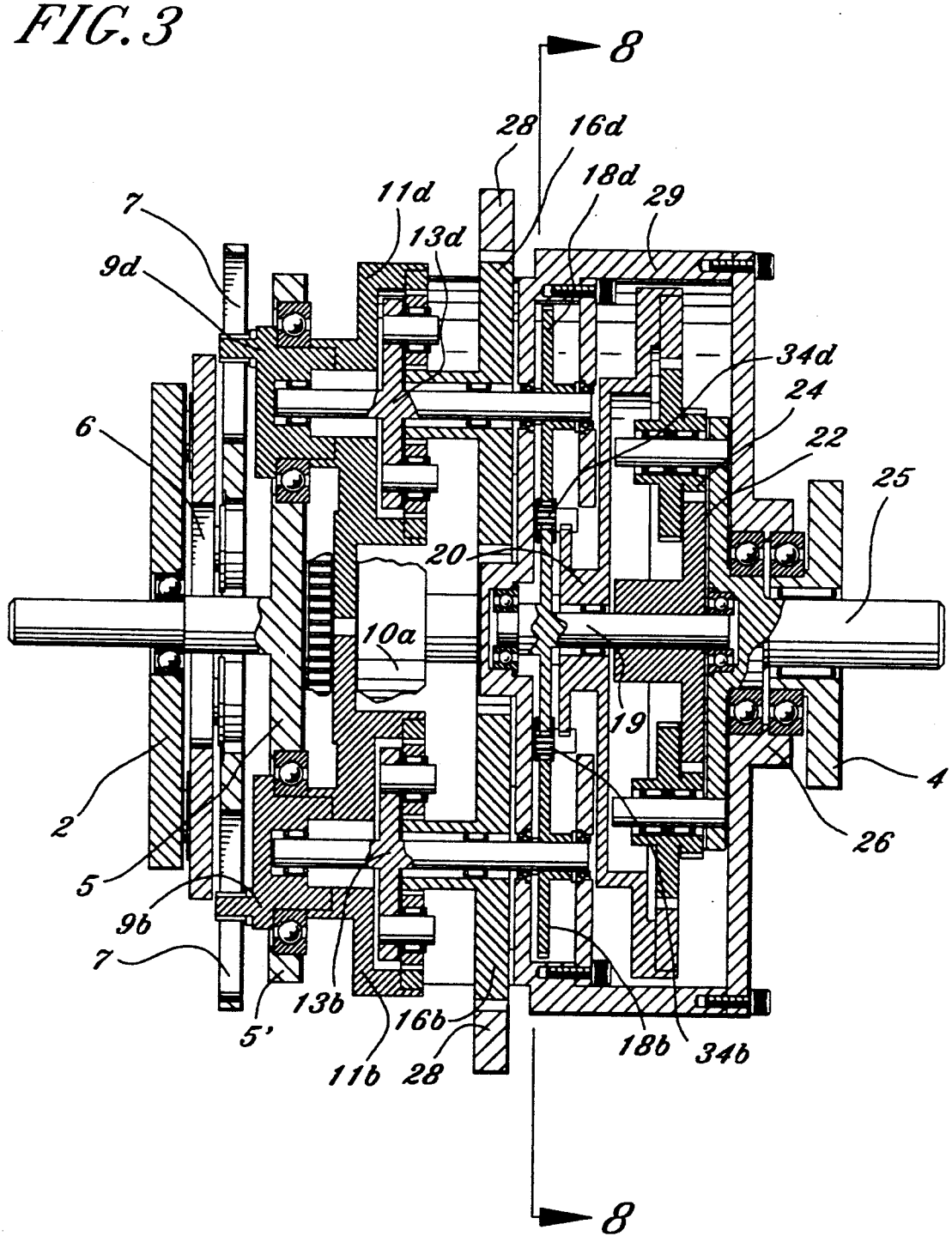
FIG. 3 is a bottom cutaway view taken along the axis of arm crank pair (9b and 9d), taken along line 3—3 in FIG. 1.

This planetary cage supports for independent rotation four crank arms 8a, 9b, 8c and 9d which are arranged radially and equally spaced about the planetary cage axis of rotation. These crank arms are grouped into two sets of opposing arms where one set is 90° apart from the other set, corresponding to the shafts 24 in the Pires patent. One set is composed of crank arms 8 and 8c while the other is composed of crank arms 9b and 9d. Crank arm pair 8a and 8c and the components associated with it are detailed in FIG. 2. FIG. 3 is a similar detail pertaining to the 9b and 9d set. Each of the four arms has a roller affixed to one end thereof and parallel to the arms axis of rotation but offset from this axis to form a crank. Each of these rollers extend into close fitting slots in the index plate 7 corresponding to the index plate 84 in the Pires patent.

Figure 4:
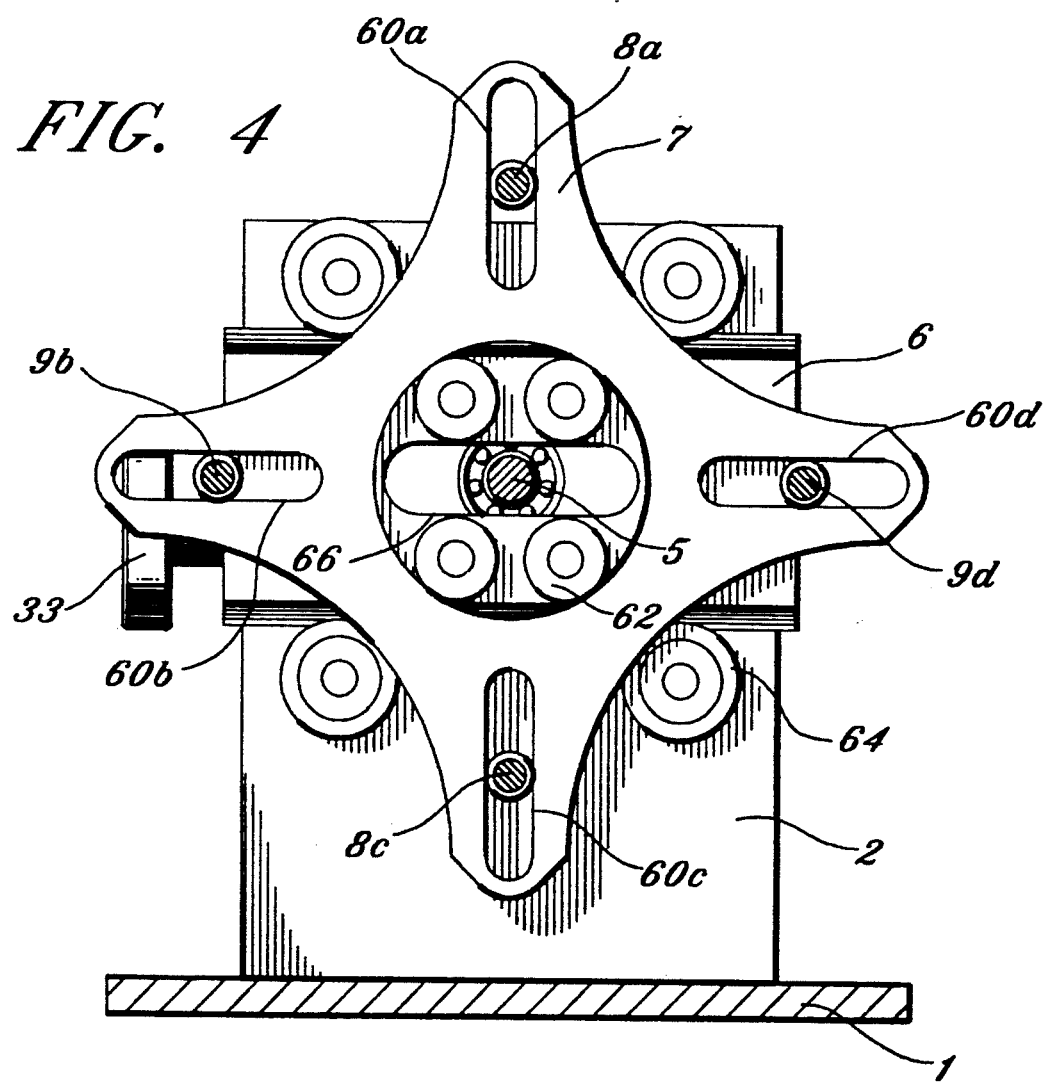
FIG. 4 is a rear cutaway view showing the index plate (7) and index slide (8), taken along the line 4—4 in FIG. 2.

Referring to FIG. 4, the slots 60a-d in the index plate 7 are positioned radially about the index plate's axis of rotation, equally spaced, and oriented normal to that axis. The index plate 7 is supported for rotation about its own axis by bearing rollers 62 affixed to the index slide 6. Index slide 6 is supported by bearing rollers 64 attached to front support 2 in such a way as to only allow lateral (horizontal) movement. Clearance has been provided by a slot 66 in the index slide 6 so that the shaft 5 can pass through and allow lateral motion of index slide 6 without interference.

Returning to FIG. 1, the lateral motion of the index slide 6 is controlled by the adjustment knob 33 by way of screw 31, to which the knob 33 is attached, which freely turns in fixed block 32, but is restrained by block 32 from lateral movement. In this way, turning the knob 33 turns the screw 31 which forces the index slide 6 by way of the threaded block 30 attached to it, to move back and forth in response to turning knob 33 clockwise and counterclockwise. This arrangement allows the index plate's axis of rotation to be adjusted to any lateral position from an eccentric position to the left of shaft 5, to a position concentric to shaft 5, to an eccentric position to the right of shaft 5 as seen from FIG. 1.

Figure 5:
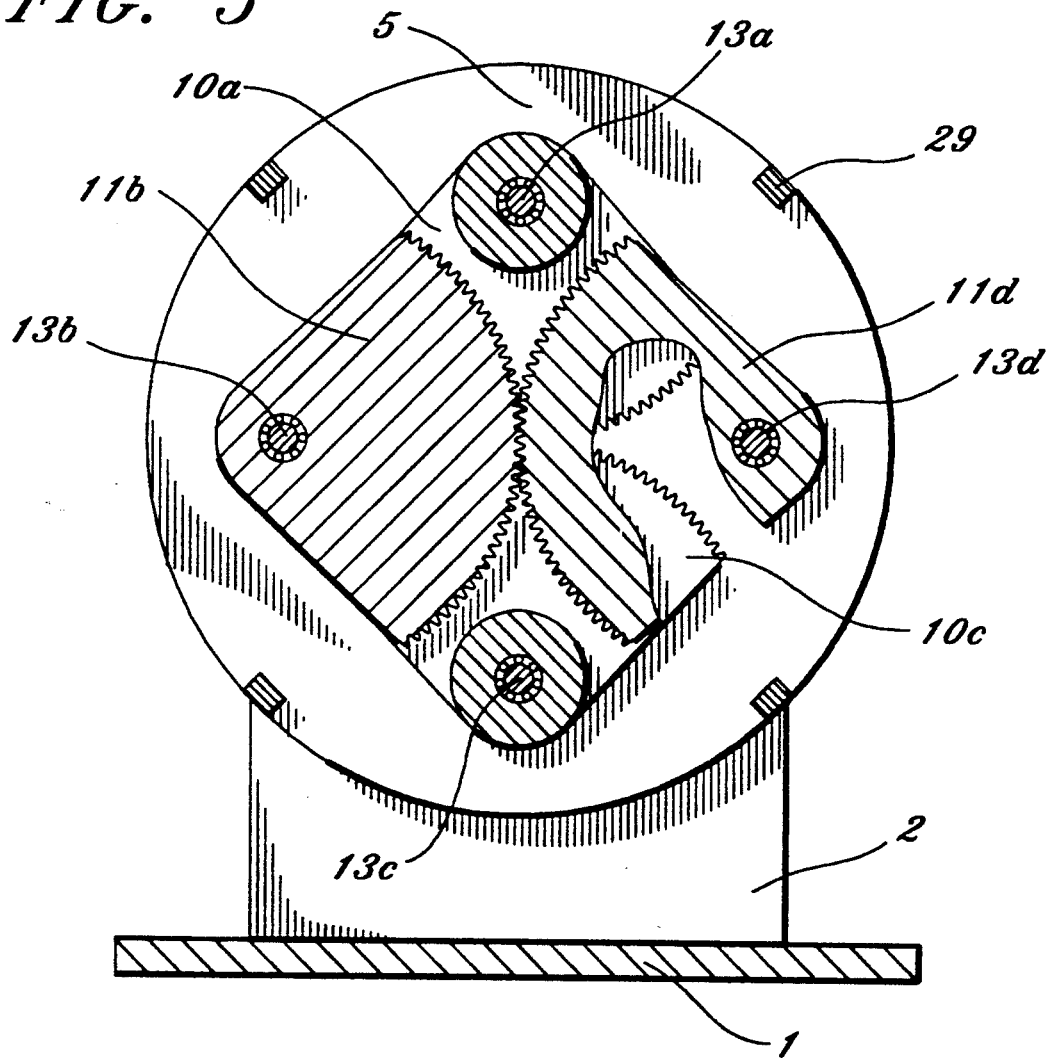
FIG. 5 is a rear cutaway view showing the synchronizing sector gears, taken along line 5—5 in FIG. 2.

Returning to the crank arms and FIG. 2, it can be seen that crank arms 8a and 8c are connected to sector ring hubs 10a and 10c, respectively. Sector hubs 10a and 10c have intermeshing sector gears, FIG. 5, formed in them which force the hubs to have an angular position, relative to the planetary cage, equal and opposite to each other and therefore they can only have rotational speed about their own axis equal and opposite to each other. As shown in FIG. 3, the arm pairs 9b and 9d are similarly synchronized by sector hubs 11b and 11d but it should be noted that the motion of one arm pair does not effect the other pair.

Figure 6:
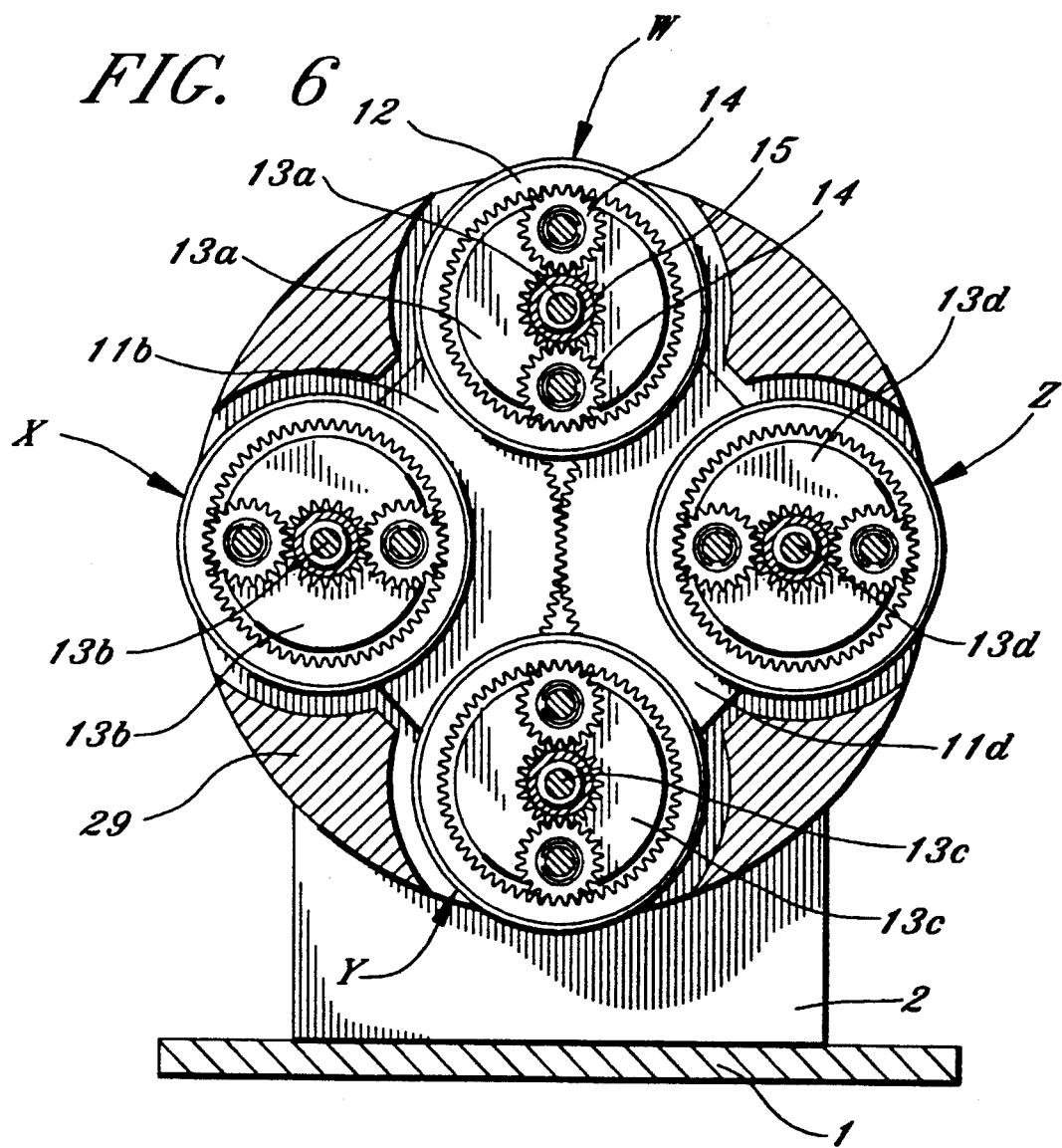
FIG. 6 is a rear cutaway view showing the arm planar differentials taken along line 6—6 in FIG. 2.
Figure 7:
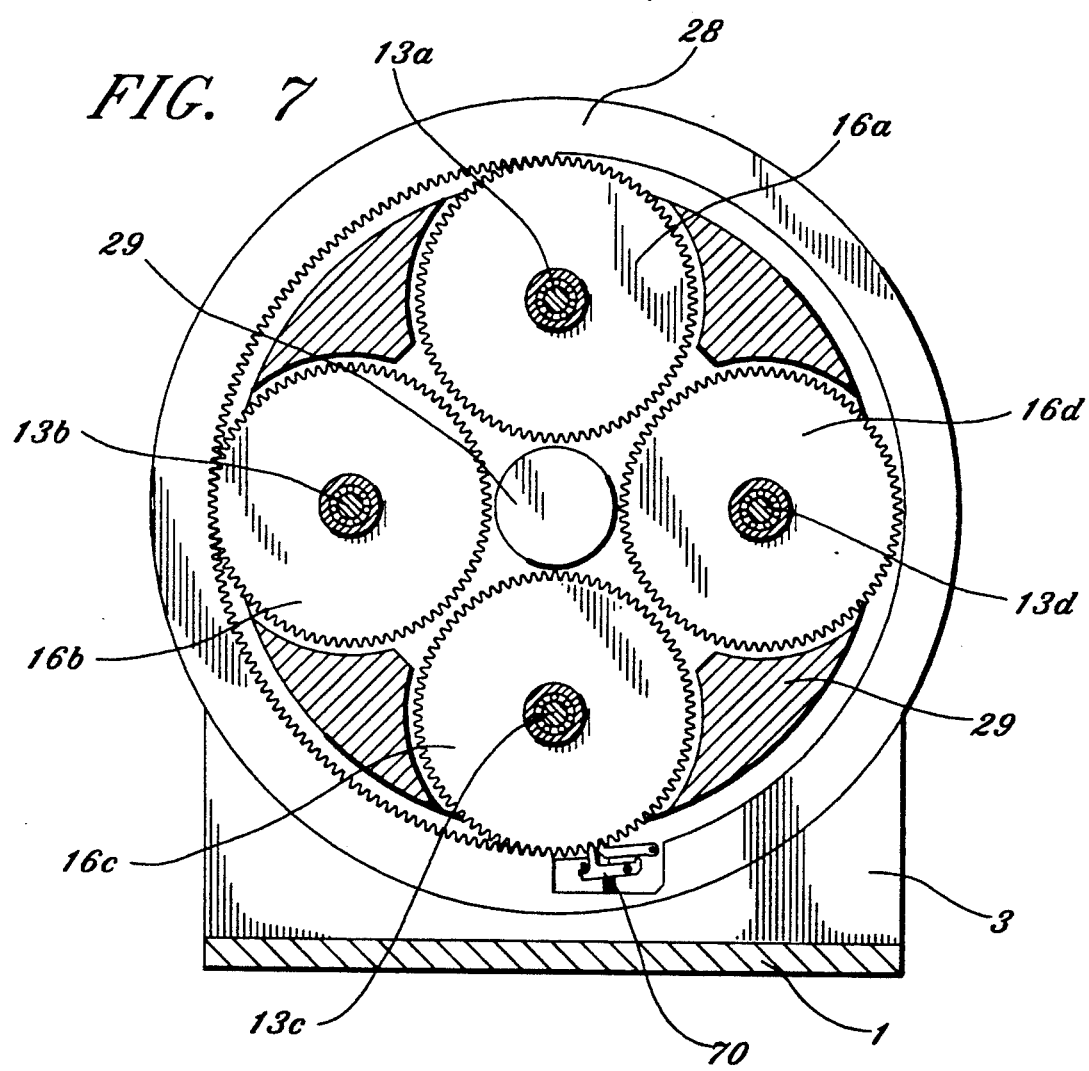
FIG. 7 is a front cutaway view showing the commutator gear and reaction gears forming the switching assembly of the IVT, taken generally along line 7—7 in FIG. 2, and serving as the origin of FIG. 22.

For the time being, following only the components associated with arm crank pairs 8a and 8c as shown in FIG. 2, note that each sector hub 10a and 10c associated with each crank arm 8a and 8b, respectively supports for rotation and drives an internal toothed ring gear 12 meshed with the pinions 14 of a planetary gear set. As seen in FIG. 6, these planetary gear sets are composed of a ring gear 12, a solar gear 15 and pinions 14 which are supported for rotation by the fixed pins of the arm spider 13. The solar gear 15 is connected to the reaction gear 16 which is meshed with the internally toothed commutator gear 28 which is held rigidly by the bracket 3 fixed to the base as seen in FIG. 7. Note that the commutator gear has internal teeth over only 180° and is smooth about the remainder of its internal surface. The solar gear 15, in FIG. 6, and the reaction gears 16a-16d, in FIG. 7, are supported for rotation by bearings on the shaft of the arm spider 13 which in turn is supported by bearings in the sector hub, the planetary rotor 29 and the support plate 27. Specifically, the shafts of the arm spiders 13a and 13c pass through the planetary rotor 29 and drive the gears 17a and 17c, respectively.

Figure 9:
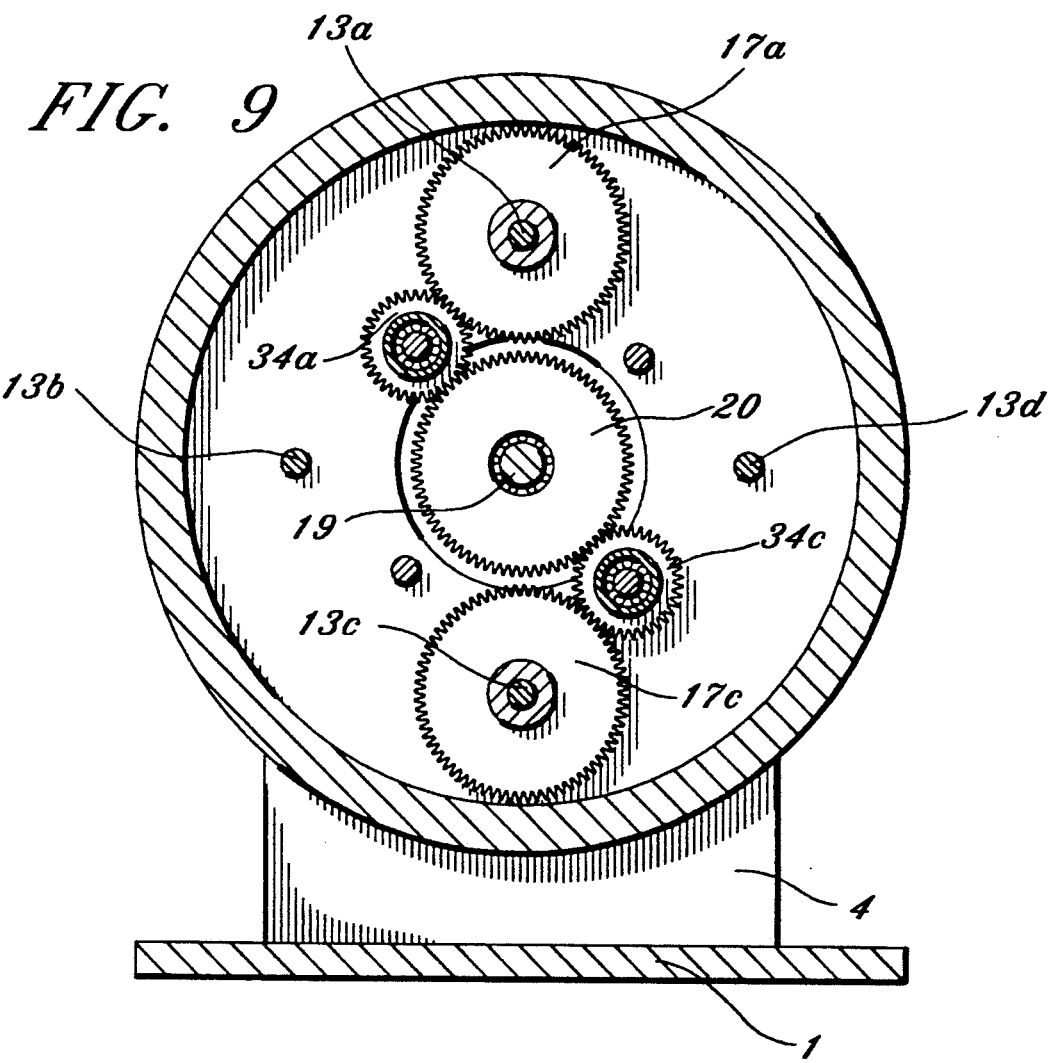
FIG. 9 is a front cutaway view showing the connections of the power path originating with arm cranks (8a) and (8c), taken generally along line 9—9 in FIG. 2.
Figure 10:
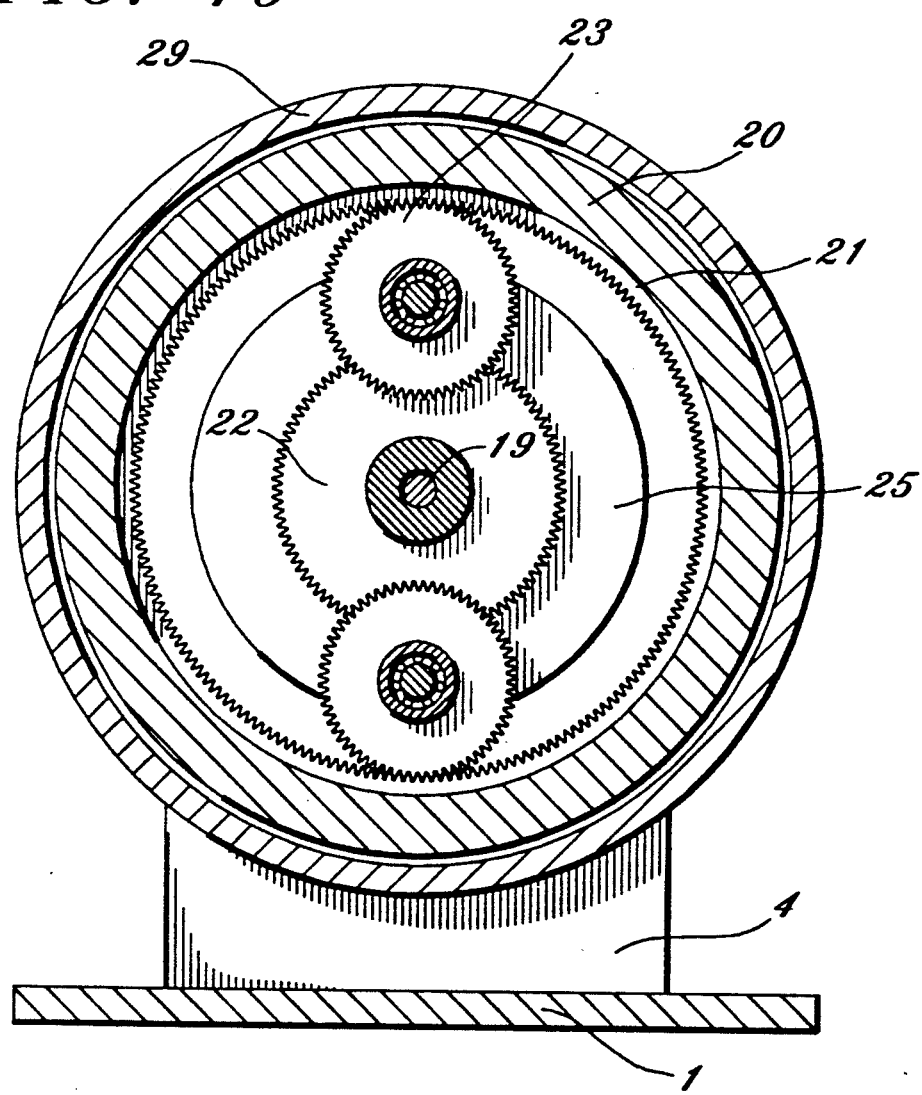
FIG. 10 is a front cutaway view showing the output differential, taken generally along line 10—10 in FIG. 2.

Turning now to FIG. 9, gears 17a and 17c mesh with idler gears 34a and 34c which are supported for rotation by pins bridging the gap between the planetary rotor 29 and the support plate 27. These idler gears are in turn meshed with the central gear of the output ring gear hub 20 which supports for rotation and drives the output ring gear 21 which is meshed with gear 23 of the compound pinion, as seen in FIG. 2.

Figure 8:
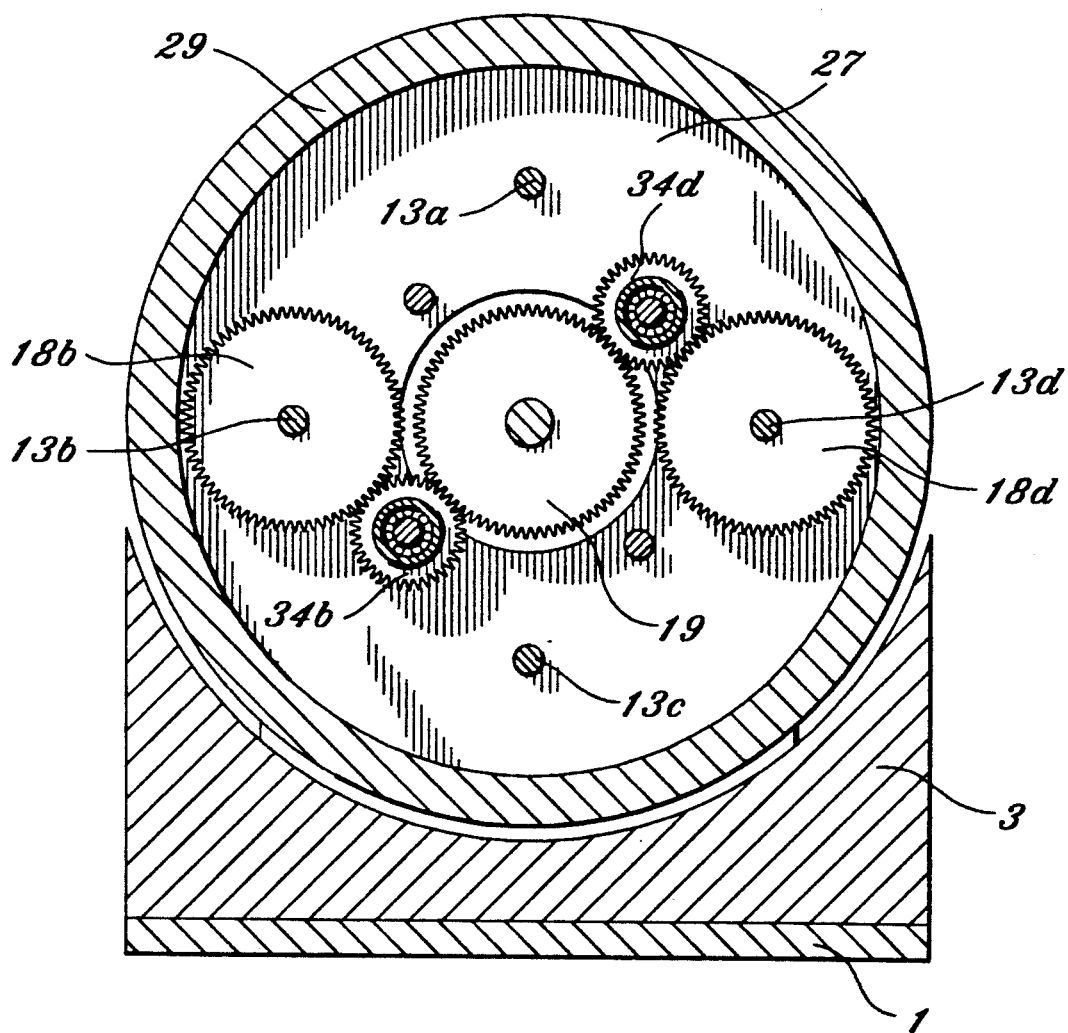
FIG. 8 is a front cutaway view showing the connections of the power path originating with arm cranks (9b) and (9d), taken generally along lines 8—8 in FIG. 3 and noting that gears (17a), (17c), (34a), (34c) and (20) have been removed for clarity.

Returning to the components associated with the crank arm pairs 9b and 9d, and to FIG. 3, note that the path of connections from this arm crank pair is essentially identical except that as shown in FIG. 8, the arm spiders 13b and 13d drive gears 18b and 18d, meshed with idler gears 34b and 34d which in turn drive the central gear of shaft 19 which drives the output sun gear 22 which is meshed with gear 24 of the compound pinion.

The compound pinion is supported for rotation by, and in turn drives the output spider 25 which is supported for rotation by bearings in both the planetary cage and the rear support 4. A shaft on the output spider 25 extends through the rear support 4 to form the output shaft.

Figure 11:
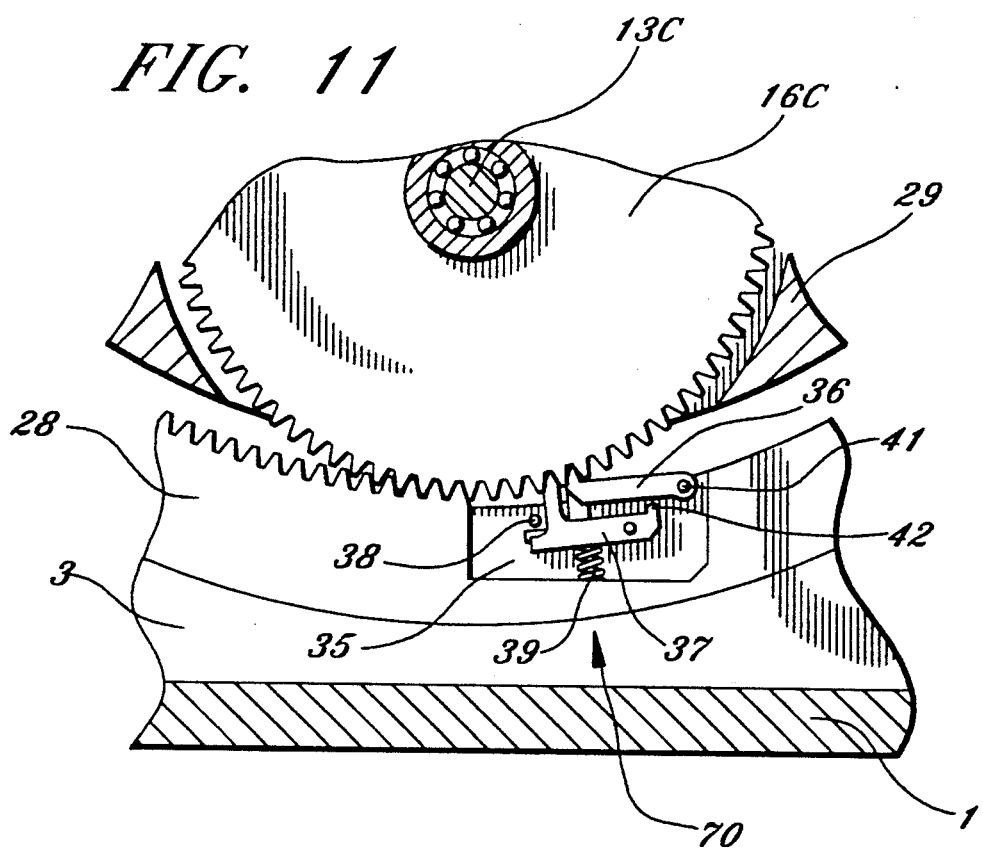
FIG. 11 is an enlargement of the tooth correction area of FIG. 7.

As seen in FIG. 11, the tooth correction mechanism 70 can be seen. This is composed of a mounting bracket 35 equipped with a stop pin 38 and two pivots upon which are supported for rotation the leading finger 36 and the trailing finger 37. Both fingers are limited in rotation by the stop pin 38 and are biased towards it by individual spring 39 connected with finger 37 and a second spring (not shown) connect with finger 36.

Having described the overall device ID structurally, attention is now directed to the way in which it functions. Clockwise rotation from an outside power source is supplied to the shaft planetary front plate 5' through its shaft which in turn drives the planetary cage and all components carried by it in a clockwise direction. The arm crank pairs 8a, 8c, and 9b, 9d drive the index plate 7 in rotation about its own axis by way of the crank rollers engaged in the slots 60 of index plate 7. The crank arms drive the index plate 7 in synchronized rotation with the planetary cage because the sector gear hubs 10a, 10c and 11b, 11d, which are intermeshed as pairs and connected to arm cranks 8a, 8c, 9b and 9d, respectively, only allow opposing arm cranks to move in directions equal and opposite to each other. For the index plate 7 to advance or retard in rotation relative the planetary cage, arm cranks would have to rotate in the same direction as their opposing crank in each set. Furthermore, the center of rotation of the index plate 7 can be shifted laterally off of the axis of rotation of the planetary cage, by turning knob 33 which rotates screw 31 in a fixed block 32 and threaded block 30 which forces index slide 6 laterally off center. In this eccentric position, the index plate 7 continues to turn in synchrony with the planetary cage but the arm crank pairs are forced to oscillate about their own axes while orbiting with the planetary cage in which they are carried, as described in the Pires patent. The frequency of this oscillation is always one rotational sweep of each arm crank clockwise and counter clockwise, relative to the planetary cage, per each input rotation. The amplitude of this rotation is a sinusoidal function of the ratio of the sine of input angle times lateral offset of index slide 6 divided by crank arm length. The equation for crank arm speed is:

$$\omega_{crank} = \frac{\omega_{in} \, l \cos\theta}{L\sqrt{1 - \left(\frac{l}{L}\sin\theta\right)^2}} + \omega_{in}$$

Where:
$\omega_{in}$ is input speed;
L is crank length;
l is lateral displacement of (6);
$\theta$ is planetary cage angular position.

The starting point of each oscillation or its zero point occurs when the arm crank axis is rotationally positioned 90° to the plane defined by the lateral offset of the index slide 6. The peak amplitude of each arm crank speed always occurs when each crank arm axis is in line with the lateral offset of the index slide 6.

Figure 15:
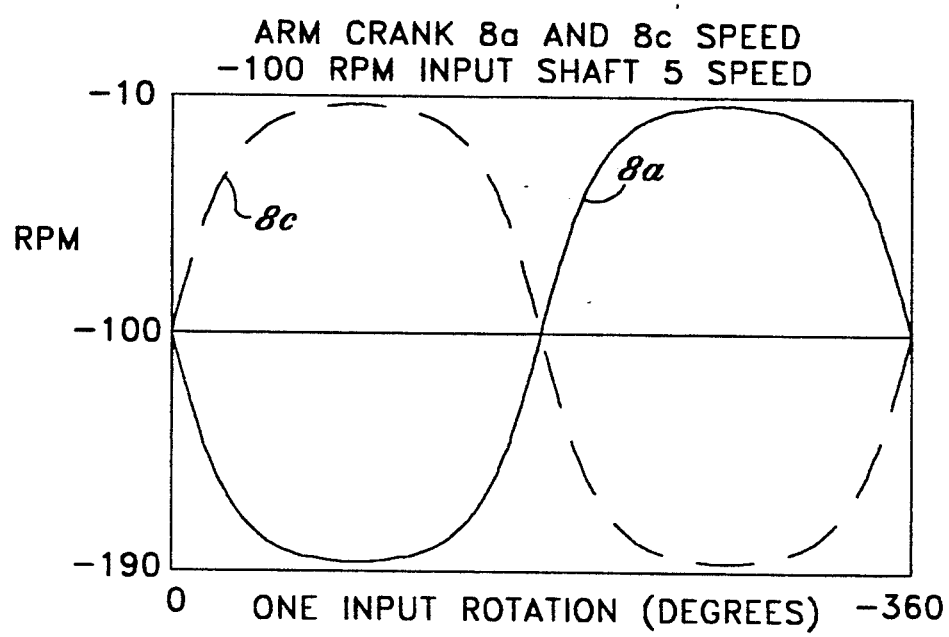
FIG. 15 is a graphical representation of the rotational speed of arm cranks (8a) and (8c), during one input rotation, at 100 rpm input speed clockwise delivered to input shaft (5)

FIG. 15 is a graph of the arm crank 8a and 8c speeds in rpm, during one full rotation of the planetary cage at 100 rpm. The zero position of the graph's horizontal axis corresponds to the planetary position shown in FIG. 1. In this example the arm crank length is 1.5" and the index slide lateral offset is 1.30" to the right of the planetary center line as seen in FIG. 1.

Figure 16:
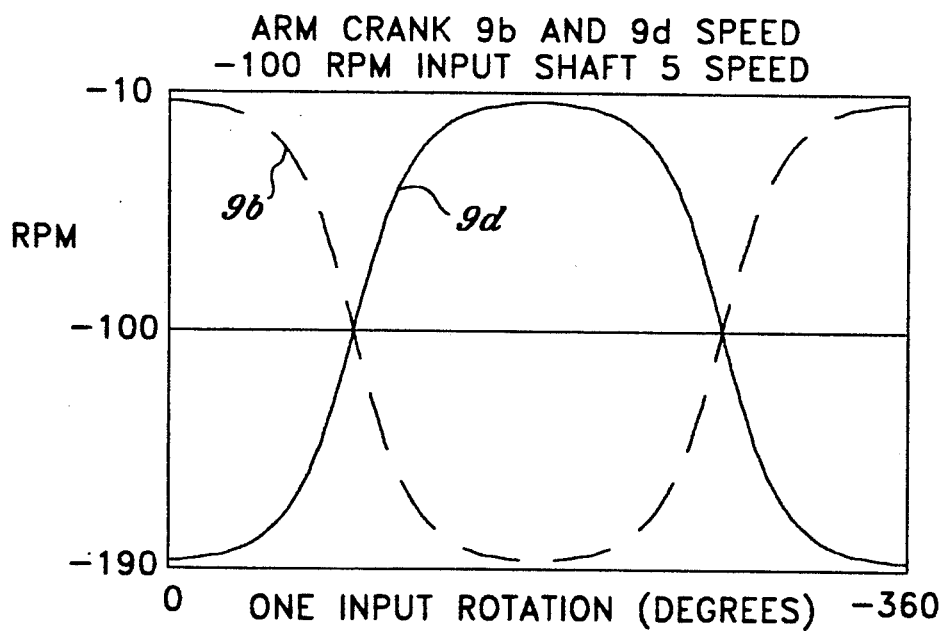
FIG. 16 is a graphical representation of the rotational speed of arm cranks (9b) and (9d), during one input rotation, at 100 rpm input speed clockwise delivered to input shaft (5)

FIG. 16 is a graph of arm crank 9b and 9d speeds in rpm, during one full rotation of the planatary cage at −100 rpm. The zero position of the graph's horizontal axis corresponds to the planetary position shown in FIG. 1. In this example, the arm crank length is 1.5" and the index slide lateral offset is 1.30" to the right of the planetary center line as seen in FIG. 1.

Following the path of these oscillations from the arm cranks 8a and 8c in FIG. 2, it can be seen that these rotational oscillations are delivered to the planar gear sets by way of the ring gears 12. The other inputs to the planar gear sets are the sun gears 15a and 15c driven by the reaction gears 16a and 16c running in the stationary commutator gear 28. Looking at FIG. 7, it can be seen that the reaction gears 16a and 16c are only driven by the commutator during one half of an input rotation due to the 180° of internal teeth in commutator 28 and are free during the other half of an input rotation. It should also be noted that when one reaction gear 16 is driven for example, gear 16c, its opposing reaction gear, for example, gear 16a is free. This is also true for the other set of reaction gears 16b and 16d, so one reaction gear of each pair is always driven while the other reaction gear of each pair is free. The timing of this change over from free to driven occurs when each reaction gear is in a position 90° from the horizontal plane defined by the lateral motion of the index slide 6. This is the precise time in the input rotation when the arm crank associated with that reaction gear is at rest relative to the planetary cage. At that moment, the ring gear oscillations to the planar gear sets are the same speed since the oscillations present at arm cranks 8a and 8c have stopped preparatory to reversing. And, the speed of the arm spiders 13a and 13c are the same since they drive, in tandem, the central gear 20 through idler gears 34a and 34c. Therefore, the sun gear 15a and 15c speeds must be the same. This means that any "free" reaction gear will automatically assume the proper rotational speed for running in the fixed commutator gear 28 at the time it enters the toothed half of the commutator gear 28. So, the speed of both arm spider gear sets 13a and 13c is the average of the engaged reaction gear speed plus the speed of oscillation of the arm crank associated with the engaged reaction gear, adjusted by the ratio of the ring gear 12 gear pitch diameter to the solar gear 15 gear pitch diameter. The exact equations for the arm spider speed is:

$$\omega_{re} = \omega_{in}\left(1 - \frac{R_{com}}{R_{react}}\right)$$

Where:
$R_{com}$ is the pitch diameter of commutator gear (28);
$R_{react}$ is the pitch diameter of the reaction gear (16);
$\omega_{re}$ is the speed of a reaction gear (16) when engaged in the commutator gear (28).
and $$\omega_{spider} = \frac{\omega_{re} R_{sun} + \omega_{crank} R_{ring}}{R_{ring} + R_{sun}}$$

Where:
$\omega_{spider}$ is the rotational speed of (13);
$R_{ring}$ is the pitch diameter of (12);
$R_{sun}$ is the pitch diameter of (15).

Figure 17:
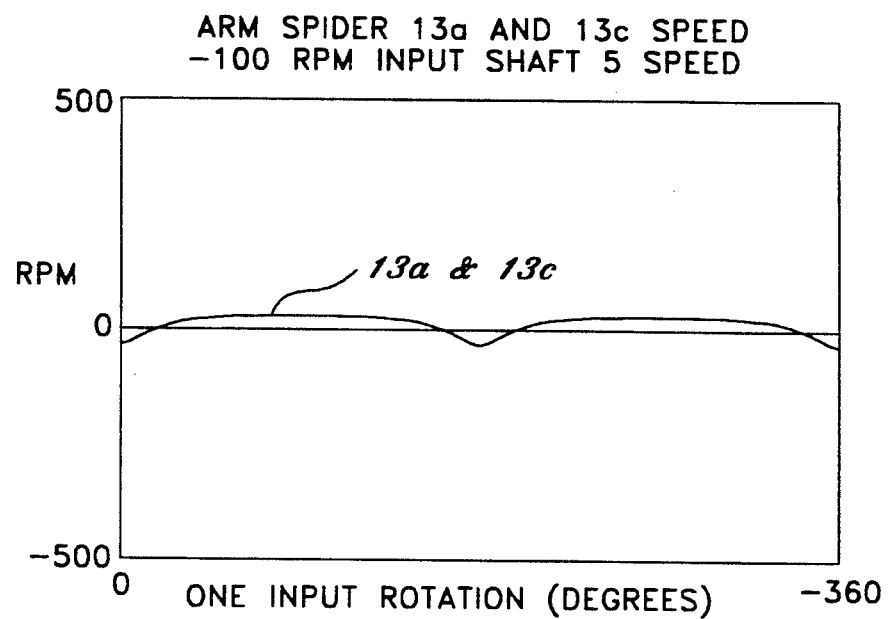
FIG. 17 is a graphical representation of the rotational speed of arm spiders (13a) and (13c), during one input rotation, at 100 rpm input speed clockwise delivered to input shaft (5)

FIG. 17 is a graph of the speed of the arm spider pair 13a, 13c in rpm using the arm crank speeds and the same 100 rpm input speed specified in FIG. 15.

Figure 18:
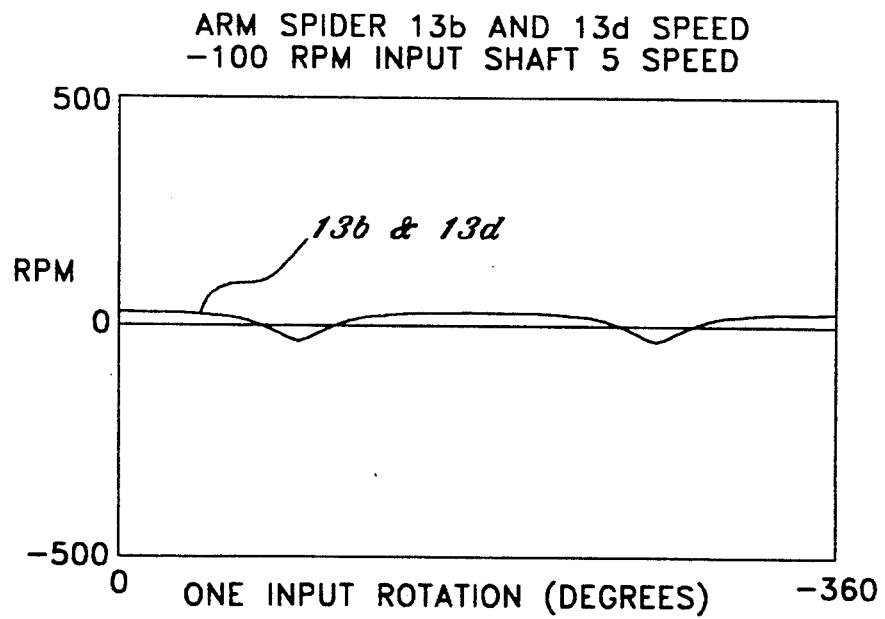
FIG. 18 is a graphical representation of the rotational speed of arm spiders (13b) and (13d), during one input rotation, at 100 rpm input speed clockwise delivered to input shaft (5)

FIG. 18 is a graph of the speed of the arm spider pair 13b, 13d in rpm using the arm crank speeds and the same 100 rpm input speed specified in FIG. 16.

Once the arm spider speeds are known, computing that speed of the free reaction gear for each arm spider set is as follows using the above terms and $\omega_{react}$ to represent the free reaction gear speed:

$$\omega_{react} = \frac{\omega_{spider}(R_{ring} + R_{sun}) - \omega_{crank} R_{ring}}{R_{sun}}$$

Figure 19:
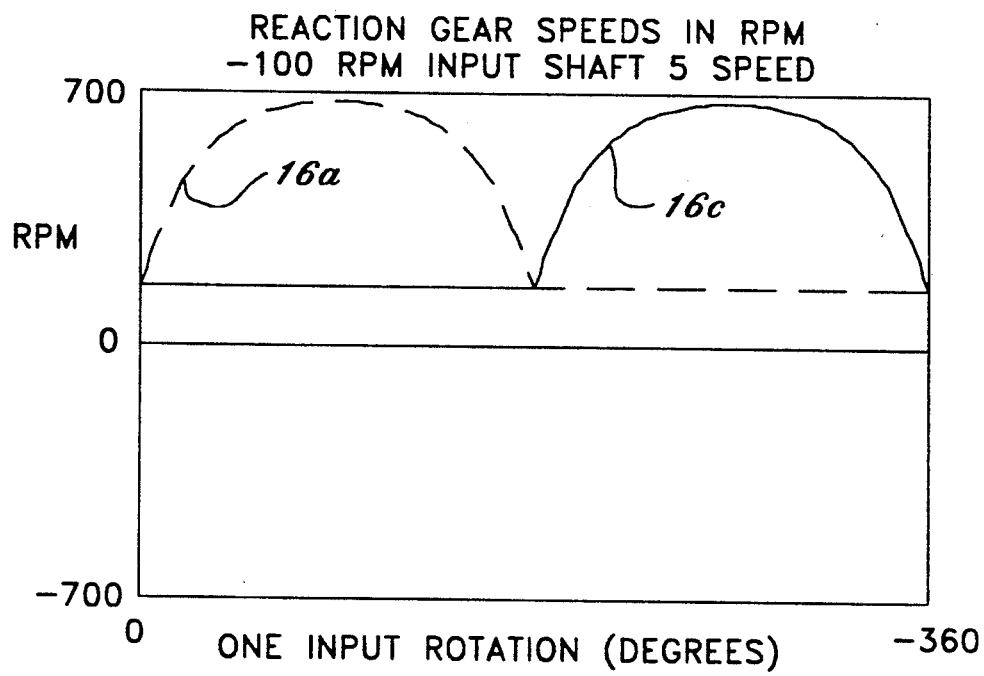
FIG. 19 is a graphical representation of the rotational speed of reaction gears (16b) and (16d), during one input rotation, at 100 rpm input speed clockwise delivered to input shaft (5)

FIG. 19 is a graph of the reaction gear 16a and 16c speeds for the conditions found in FIGS. 15 and 17. Note by comparison to FIG. 7 that the "free" reaction gears assume the speed of the engaged reaction gears at the same time they re-enter the commutator gear 28.

Figure 20:
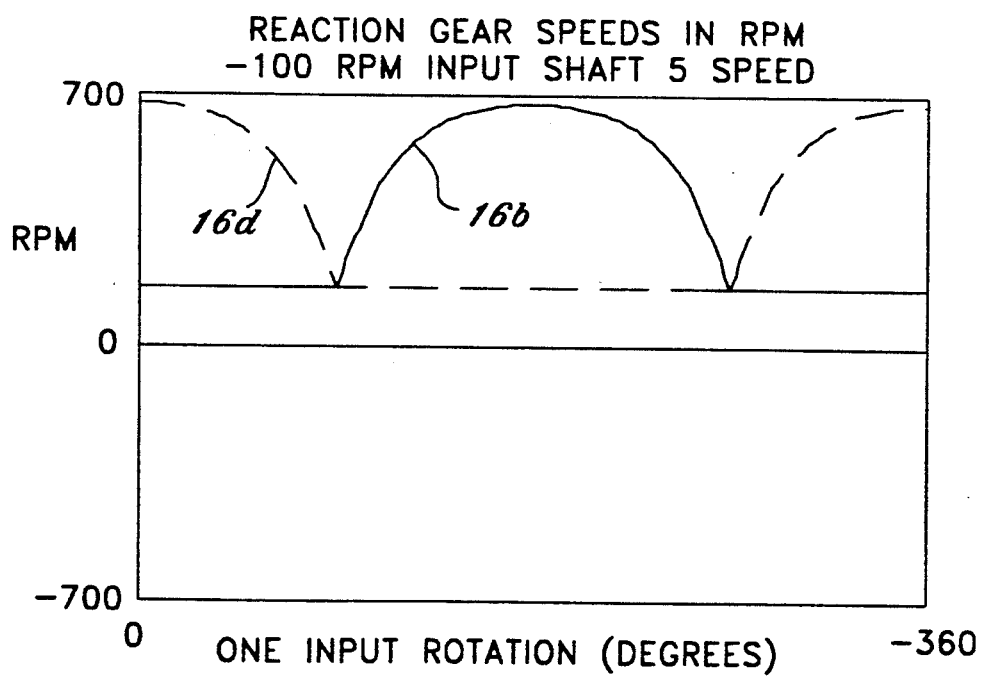
FIG. 20 is a graphical representation of the rotational speed of reaction gears (16b) and (16d), during one input rotation, at 100 rpm input speed clockwise delivered to input shaft (5)

FIG. 20 is a graph of the reaction gear 16b and 16d speeds for the conditions found in FIGS. 16 and 18. Note by comparison to FIG. 7 that the "free" reaction gears assume the speed of the engaged reaction gears at the time they re-enter the commutator gear 28.

In one embodiment the interface between the reaction "gears" 16a-16d commutator "gear" 28 could be a traction element where the reaction gears are replaced by rollers and the commutator is replaced by an interrupted track and no further effort would be necessary to assure "meshing". However, in the preferred embodiment, where a geared interface is employed, a tooth correction mechanism is required to assure that the "free" reaction gear meshes properly with the commutator gear 28 upon re-entry into the toothed portion of the commutator gear. This is required since the "free" reaction gear has advanced or retarded (rotated about its own axis) an unpredictable amount in response to the oscillation of the arm crank associated with the opposing "driven" reaction gear. To compensate for this the reaction gear must be advanced or retarded at most ½ of a gear tooth spacing upon re-entry, as will be described below.

Figure 12:
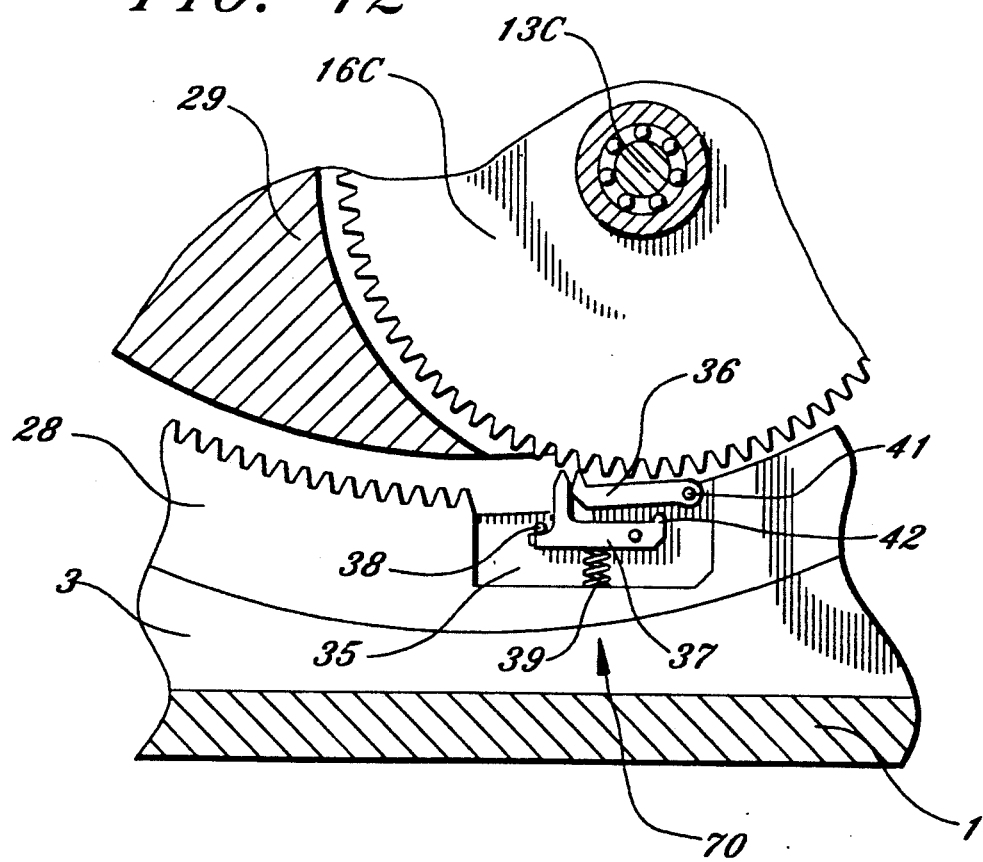
FIG. 12 is a duplicate view of FIG. 11 with the planetary cage retarded in rotation 22°.
Figure 13:
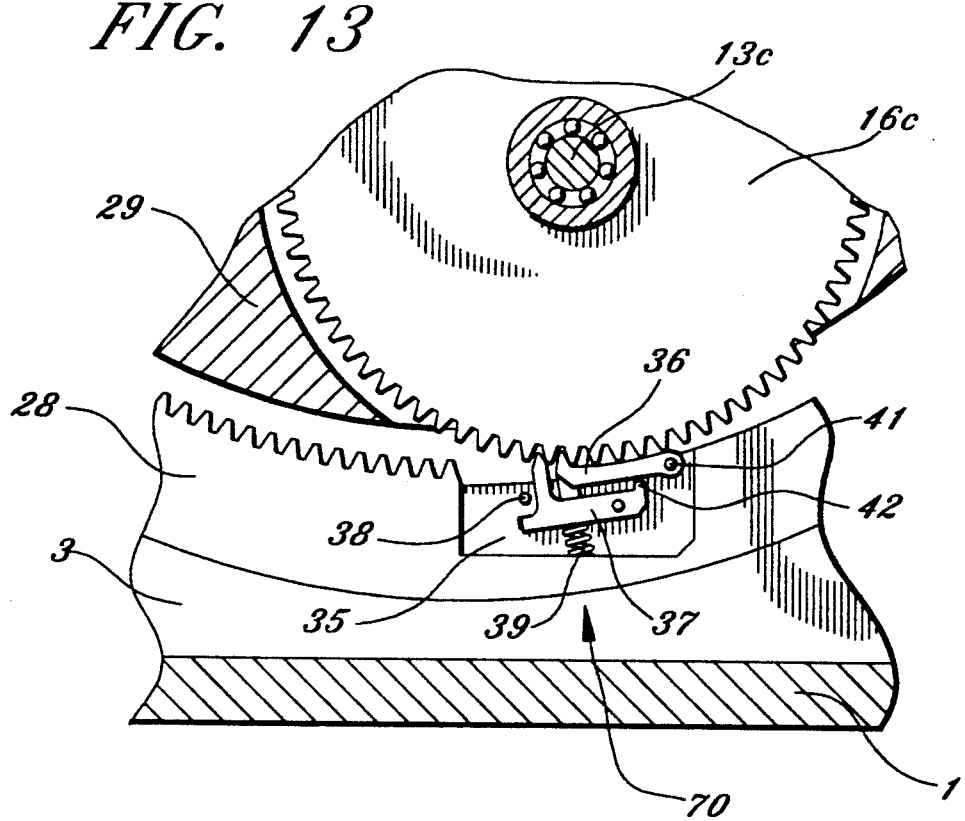
FIG. 13 is a duplicate view of FIG. 11 with the planetary cage retarded in rotation 15°.
Figure 14:
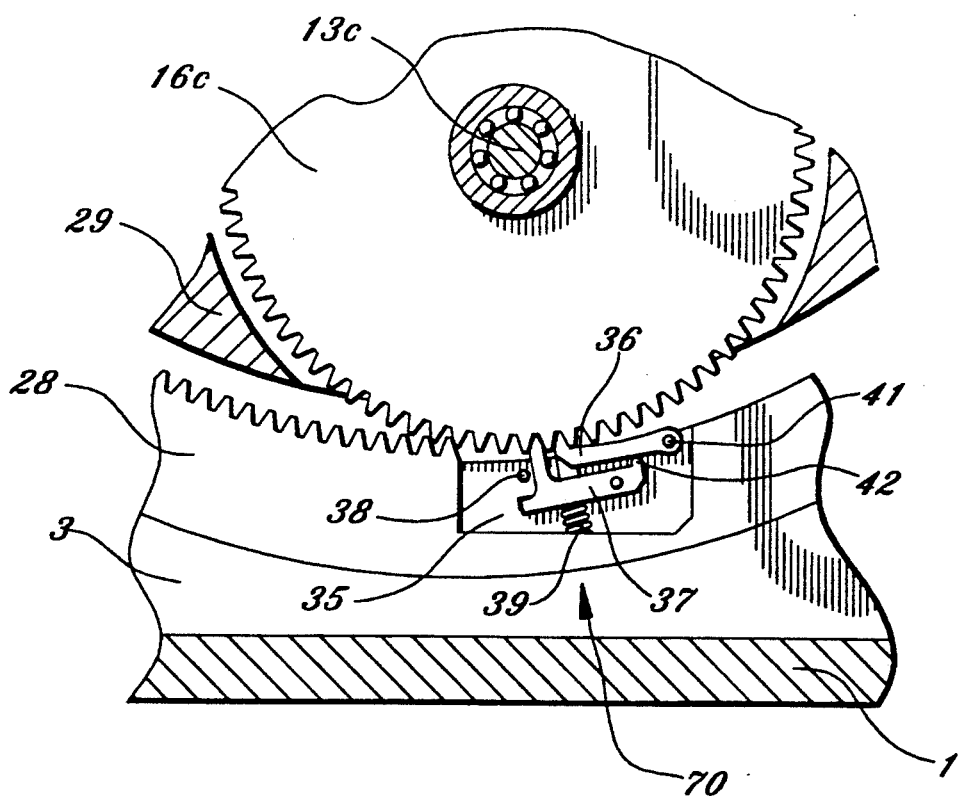
FIG. 14 is a duplicate view of FIG. 11 with the planetary cage retarded in rotation 7°.

FIG. 11 is an enlargement of sections of commutator gear 28, illustrating particularly tooth correction mechanism 70. FIG. 12 shows reaction gear 16C just prior to encountering the tooth correction device 70 which is in the extended position. In this position, both the leading finger 36 and the trailing finger 37 are fully extended by the bias springs 39 and 40. In this position the tips of the two fingers are spaced apart slightly less than the gap between the two reaction gear teeth. Because of this spacing, one or the other or both of the fingers must fall in a tooth spacing of the on-coming reaction gear 16C. As the reaction gear 16C progresses towards engagement with the internal teeth of the commutator gear 28, both fingers are forced downward against their springs which spreads the gap between the two fingers. This action causes the finger closest to engagement to move into a reaction gear tooth gap to control the gears rotational position at the same time the finger furtherest from engagement to is caused advance or retard to the next tooth gap as seen in FIG. 13. After this occurs, the reaction gear moves to a position between the axis of the planetary rotation and the point between the two finger tips. At this position both fingers are forced down until the rocker stop 42 on the rear portion of the trailing finger interferes with the back surface of the leading finger to limit both fingers downward travel, FIG. 14. In this position both fingers occupy positions along the pitch diameter of the gear 28 and are in positions identical to where commutator gear teeth would be if extended that far. As such, they have adjusted the position of the reaction gear teeth so that it will progress onward into mesh with the commutator gear. This does not bind the overall device even though this tooth correction mechanism is acting upon the free reaction gear 16C while its opposing reaction gear 16A is still being driven by the commutator gear, since even a precision gear train has enough cumulative backlash to allow this. It does provide for control of at least one reaction gear set of each arm crank pair even at the reaction gears change-over point from driven to free.

To summarize, the arm cranks and index assembly produce oscillations at the arm cranks when the index center of rotation is displaced laterally (off-center) from a position concentric with the axis of rotation of the planetary cage. These oscillations are one of two inputs to the arm planar gear sets (planar differential) the other input being rotation from the reaction gear 16A, 16B, 16C or 16D but only when the reaction gear is engaged with the commutator gear 28. This means that the oscillation of an arm crank can only contribute to the speed of an arm spider 13 if its associated reaction gear is engaged with the commutator gear. If the reaction gear of an arm crank is "free" from the commutator it rotates in response to its associated arm crank oscillation, allowing the common arm spiders 13 in that pair to rotate in response to the engaged reaction gear and at the speed of the oscillation present at the arm crank associated with the engaged reaction gear.

This rotational speed seen at the arm spiders plus the orbital speed of the planetary cage is conducted to the central gear of the output ring hub 20 by way of gears 17a, 17c, 34a and 34c. This hub supports and drives the ring gear 21 of the output differential.

The function of arm cranks 9b and 9d and their connections are identical to that of arm cranks 8a and 8c described above except that the arms cranks 9b and 9d are mounted in the planetary cage positionally 90° from arm pair 8a and 8c and the arm spiders associated with them, 13b and 13d, are connected to the central gear of shaft 19 by way of gears 18b and 18d and idler gears 34b and 34d. As with the arm spiders 13a and 13c, when the geared connections from 13b and 13d feed inward to the central gear of 19, a planetary rotation speed is also delivered to the gear of 19 which in turn drives the output differential solar gear 22.

The rotational speed of the two arm spider pairs plus input rotation become the two inputs to the output planar differential. The equation for the output spider-shaft speed 25 is as follows:

$$\omega_{out} = \frac{\omega_{spider}\left(\frac{R_{sun}}{R_{sPin}}\right) + \omega_{crank}\left(\frac{R_{ring}}{R_{rPin}}\right) + 2\omega_{in}}{\left(\frac{R_{sun}}{R_{sPin}}\right) + \left(\frac{R_{ring}}{R_{rPin}}\right)}$$

Where:
$R_{ring}$ is size of (21);
$R_{sun}$ is size of (22);
$R_{sPin}$ is size of (24);
$R_{rPin}$ is size of (23);
$\omega_{out}$ is speed at (25).

Figure 21:
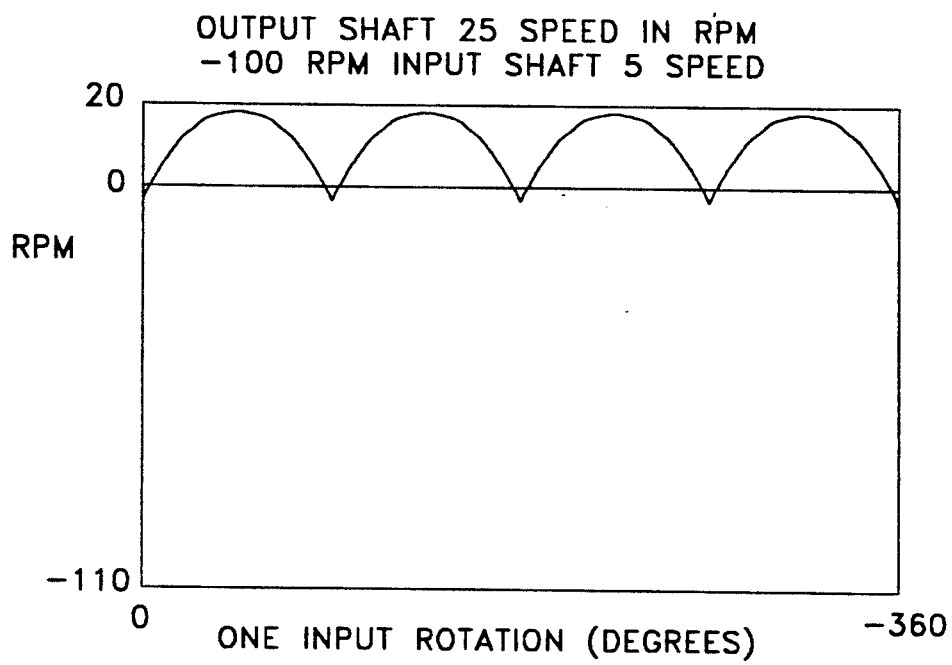
FIG. 21 is a graphical representation of the rotational speed of the output spider shaft (25), during one input rotation, at 100 rpm input speed clockwise delivered to input shaft (5) and consistent with the individual component speeds shown in FIGS. 15 through 20.

FIG. 21 is a graph of the output speed at shaft 25 for the conditions in the previous FIGS. 15-20.

Figure 22:
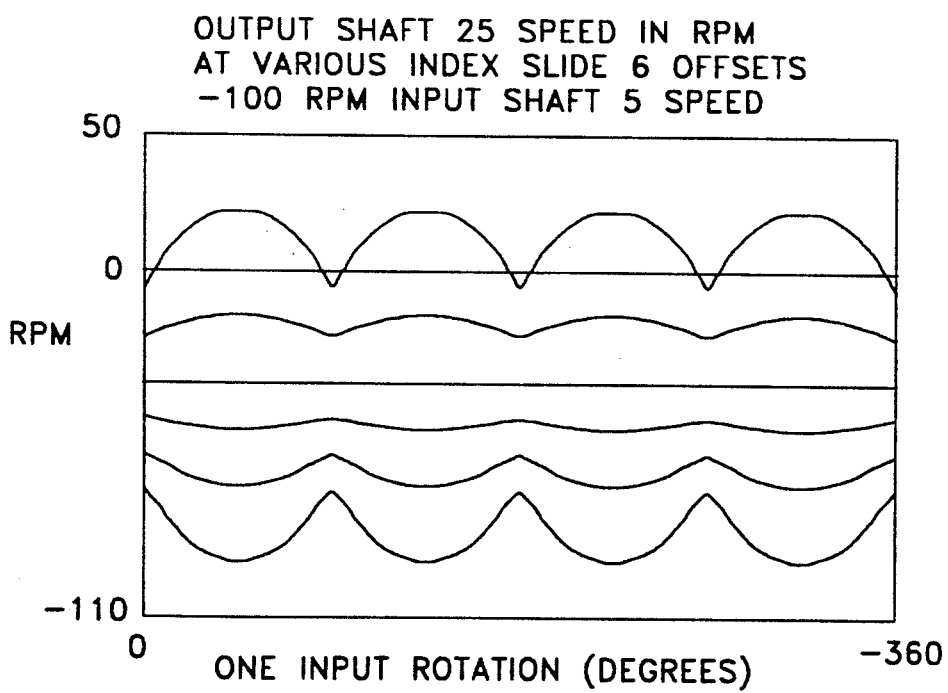
FIG. 22 is a graphical representation of the rotational speeds of the output spider shaft (25), during one input rotation, at 100 rpm input speed clockwise delivered to input shaft (5) consistent with various lateral displacements of the index slide (6)

FIG. 22 is a graph of the output speeds at shaft 25 in response to different lateral displacements of the index slide 6.

It can be seen from FIG. 22 that the above described mechanism is capable of producing average output to input speed from +11.72 rpm (reverse) counterclockwise to zero rpm (neutral) to full speed −83.72 rpm (forward) clockwise. This device is different from the prior art in that the output ratio is controlled when the device is driving an output load as well as when it is being driven by the output load (retarding). This is not true for devices which contain over-running clutches as these devices "free wheel" when they should be retarding.

Figure 23A:
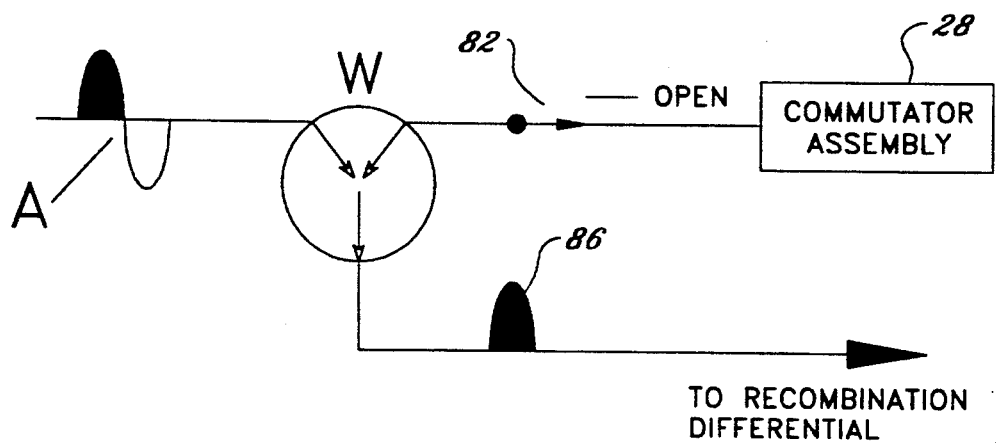
FIG. 23A and 23B diagrammatically illustrate particular features of the switching assembly shown in FIG. 1D.
Figure 23B:
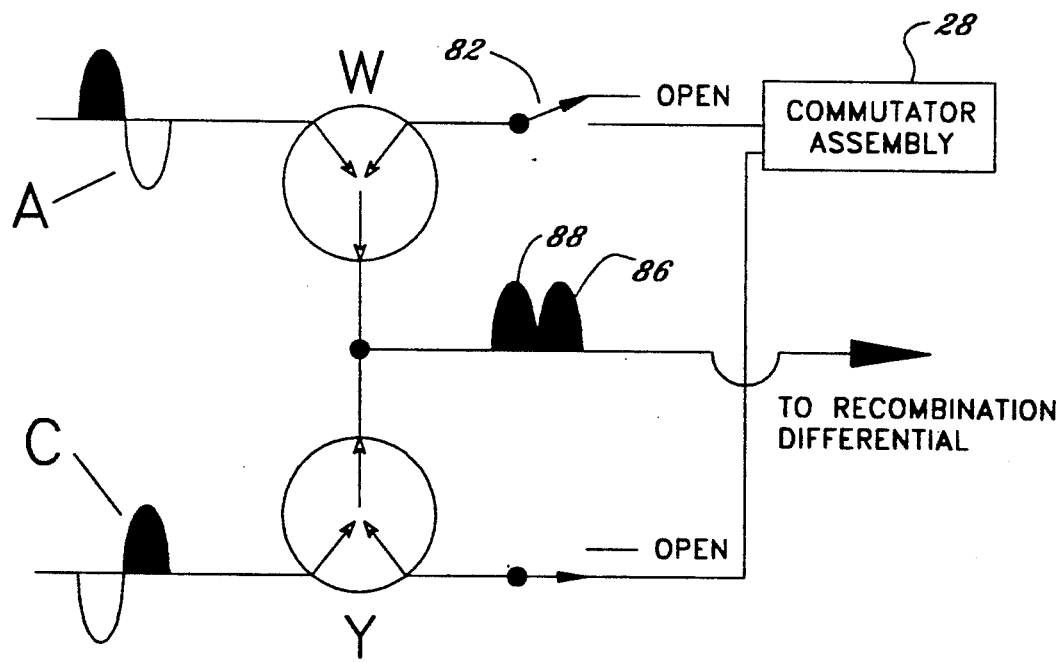

To further summarize the present invention, reference is again made to FIG. 1D in conjunction with FIG. 23A and 23B. At the beginning of the detailed description of the present invention, before Device 1D was described in detail in conjunction with FIGS. 1–22, it was described generally in conjunction with a symbolic illustration in FIG. 1D. Having now provided a detailed description of the device, it is believed worthwhile to again discuss or summarize the operation of device 1D in conjunction with the symbolic illustration in FIG. 1D and the symbolically illustrated aspects of the device shown in FIGS. 23A and 23B.

The INDEX GENERATOR illustrated in FIG. 1D symbolically depicts the "front end" of the device including crank arms 8A, 8B, 9A and 9B and the rotational oscillations they produce, which are designated at A, B, C and D. These oscillations respectively serve as inputs to the planar gear sets or differentials which in FIG. 1D are designated at W, X, Y and Z. Note that the rotational oscillation A serves as an input to the differential W, rotational oscillation B serves as an input to the differential X, rotational oscillation C serves as an input to the differential Y and rotational oscillation D serves as an input to the differential Z. It should further be recalled that the rotational oscillations A and C are 180° out of phase with one another, the rotational oscillations B and D are 180° out of phase with one another and the two sets A/C and B/D are 90° out of phase. It should also be noted here that the rotational oscillations provided by these crank arm sets are input to differentials W, X, Y and Z and are provided in the precise manner disclosed in the previously recited Pires patent, as stated above.

Still referring to FIG. 1D, the commutator gear (shown in FIG. 7) is connected to each of the planar differentials W, X, Y and Z as second inputs. In actuality, the four reaction gears 16A, 16B, 16C and 16D forming part of the commutator serve as second inputs to the four differentials. At the same time, each of these planar differentials has its own output which serves as one of two inputs to the combination differential. In this regard, note that the outputs of the planar differentials W and Y are connected together to serve as one input to the recombination differential and the outputs from planar differentials X and Z are connected together and serve as the other input to the recombination differential. Since the outputs at these planar differentials are produced and directed into the recombination differential, the latter functions to produce an output in the manner described above and also in the manner described in the previously recited Pires patent.

Attention is now directed to an operational description of the device 1D as symbolically illustrated in FIGS. 1D and in FIGS. 23A and 23B. At the outset, let it be assumed that the device is to operate on the positive polarities of the rotational oscillations. Thus, ultimately one input to the recombination differential will receive successive positive half-cycles from the rotational oscillations A and C while the other input will receive successive positive half cycles from the rotational oscillations B and D, keeping in mind that these latter two positive half cycles are 90° out of phase with the former positive half cycles. It should also be kept in mind that when a positive half cycle of rotational oscillation A is applied to its planar differential W, the corresponding negative half cycle of rotational oscillation C is being applied to its planar differential Y. This is also true for the rotational oscillations B and D.

With the foregoing in mind, attention is now directed to FIGS. 23A and 23B which illustrate how the two planar differentials W and Y produce their successive positive half cycles as a result of rotational oscillations A and C. Let it be assumed first that the darkened positive half cycle of rotational oscillation A is being applied to its input of the planar differential W. During that same time span, the corresponding reaction gear 16A serving as a second input to the planar differential W is connected to the commutator 28 (as opposed to being free) and thereby provides its own input to planar differential W, as indicated symbolically at 82 in FIG. 23A. As a result of these two inputs, the corresponding rotational half cycle is provided at the output of the planar differential for inputting to the recombination differential. During the next half cycle of rotational oscillation A, that is, during the darkened negative half cycle illustrated in FIG. 23B, the reaction gear 16A is disconnected from the commutator, as diagrammatically indicated at 82. Thus, during the time span that the negative half cycle of rotational oscillation A is present, there is no second input to the planar differential W. As a result, the planar differential W during that time span does not produce its output. However, as illustrated in FIG. 23B, the output from the planar differential Y is connected to the output of planar differential W as stated previously. Moreover, as stated previously, during the very time span that the negative half cycle of signal A is being applied to the differential W, the darkened positive half cycle of the rotational oscillation C is being applied to its input of differential Y. In addition, the reaction gear 16C which serves as a second input to the differential Y is being driven by the commutator gear 28 and, hence, serves as a second input to the differential Y. As a result, the output to the differential Y produces its own positive rotation. These successive outputs from the planar differentials W and Y are indicated at 86 and 88, respectively. Thus, one input to the recombination differential receives successive positive rotations 86 and 88. In the same way, the two planar differentials X and Z produce corresponding positive rotations to the other input of the recombination differential, although these latter rotations are 90° out of phase with the rotations 86 and 88, as indicated previously.

It should be noted that the positive rotations 86 and 88 resulting from rotational oscillations A and C and their counterparts resulting from the rotational oscillations B and D are provided without utilizing over-running clutches, as is the case in the previously recited Pires patent. This is because of the way in which the commutator is designed and synchronized with the rotational oscillations. Specifically, during the presence of the positive half cycle of the rotational oscillation A, the reaction gear 16A is in its drive mode and during the negative half cycle of rotational oscillation A, reaction gear 16A is in its free mode. This is also true for each of the other rotational oscillations and their respective reaction gear, all of which are 90° apart from one another, as illustrated in FIG. 7.

What is claimed is:

1. An oscillating ratchet style continuously or infinitely variable transmission, comprising:

(a) first means including a first member adapted for connection with an external source of rotation and rotatable by said external source for establishing a rotational input;

(b) second means operatively connected with said first means and including a plurality of second members which rotate in response to said input rotation, each of said second members rotating back and forth in accordance with its own respective oscillatory speed waveform, said waveforms being out of phase with one another in a predetermined way;

(c) third means operatively connected with said second means and including a plurality of third members which rotate uni-directionally in response to the oscillatory rotations of said second members, without the aid of over-running clutches, said third members uni-directionally rotating in accordance with their own respective speed waveforms, said third means including (i) a plurality of differential gear arrangements, one for each of said second members, each differential gear arrangement including first and second inputs and an associated one of said third members which serves as an output the first input of each differential gear arrangement being coupled with an associated one of said second members for receiving that member's rotation, and each arrangement's output generating its own one of said uni-direction rotations in response to a received rotation at its first input simultaneously with a reaction rotation at its second input, each of said outputs being coupled to fourth means, and (ii) a commutator assembly including means for producing a reaction rotation for each of said differential gear arrangements, each of said reaction rotations being coupled to the second input of an associated one of said differential gear arrangements, whereby the combination of rotations at the first and second inputs to any given differential gear arrangement results in an associated one of said uni-directional rotations at the output of that arrangement, without the aid of an over-running clutch; and (d) said fourth means operatively connected with said third means and including a fourth, output member which rotates in response to the collective rotations of said third members and which does so in a modified way relative to said rotational input, whereby to provide a modified rotational output.

2. A transmission according to claim 1 wherein:
(a) said plurality of second members consists of first, second, third and fourth members, each of which rotates at a speed and in a direction in accordance with its own respective sinusoidal waveform where a selected half-cycle of each waveform represents selected rotation in one direction and the other, unselected half-cycle represents unselected rotation in the opposite direction, each of said first and third waveforms and each of said second and fourth intermediate waveforms being 180° out of phase with one another and said first and third waveforms being 90° out of phase with said second and fourth waveforms; and (b) said commutator assembly is configured such that its reaction rotation producing means produces reaction rotations at the second inputs of said differential gear arrangements only during the time that the selected half-cycles of rotation of said second members are present at the first inputs of said differential gear arrangements and no reaction rotations during the time that the unselected half-cycles of rotation are present at said first inputs of said arrangements.

3. A transmission according to claim 2 wherein:
(a) said differential gear arrangements consist of first, second, third and fourth arrangements having their first inputs coupled to said second means;
(b) said fourth means includes a recombination differential gear arrangement having first and second inputs and an output responsive to its inputs for ultimately producing said modified rotational output; and
(c) said transmission includes means for coupling the outputs of said first and third differential gear arrangements together and to the first input of said recombination differential gear arrangement and the outputs of said second and fourth differential gear arrangements together and to the second output of said recombination differential gear arrangement.

4. A transmission according to claim 3 wherein said commutator assembly includes:
(a) stationary commutator member having a radially inward facing annular surface, one-half of which defines a continuous drive surface and the other half of which defines a non-driving surface;
(b) first, second, third and fourth reaction members mounted for rotation about their own axes within said commutator member and positioned about the center of the latter 90° from one another such that the first and third reaction members are 180° apart and the second and fourth reaction members are 180° apart, and
(c) means supporting all four of said reaction members for rotation about the center of said commutator member such that each reaction member engages the drive surface of said commutator member and is caused to rotate about its own axis as it passes over the drive surface for producing its own reaction rotation and is allowed to free-wheel about its own axis as it passes over the non-driving surface of said commutator member whereby it produces no reaction rotation.

5. A transmission according to claim 4 wherein:
(a) said reaction members are gears including external drive teeth; the drive surface of said commutator member includes cooperating drive teeth positioned to engage the drive teeth of said reaction gears; and
(b) said non-driving surface is spaced from and does not engage the drive teeth of said reaction gears.

6. A transmission according to claim 5 wherein said commutator member includes means for insuring that the teeth of each of said reaction gears properly engages the drive teeth of the commutator member's drive surface, as each reaction gear approaches the drive surface from the commutator member's non-driving surface.

7. A transmission according to claim 1 wherein said third members all rotate in only one and the same direction.

8. A transmission according to claim 3 wherein said commutator assembly includes:
(a) a stationary commutator member having an annular surface, one-half of which defines a continuous drive surface and the other half of which defines a non-driving surface;

(b) first, second, third and fourth reaction members mounted for rotation about their own axes adjacent said commutator member and positioned about the center of the latter 90° from one another such that the first and third reaction members are 180° and the second and fourth reaction members are 180° apart; and (c) means supporting all four of said reaction members for rotation about the center of said commutator member such that each reaction member engages the drive surface of said commutator member and is caused to rotate about its won axis as it passes over the drive surface for producing its own reaction rotation and is allowed to free-wheel about its own axis as it passes over the non-driving surface of said commutator member whereby it produces no reaction rotation.

* * * * *